(12) United States Patent
Eki et al.

(10) Patent No.: US 8,730,355 B2
(45) Date of Patent: May 20, 2014

(54) IMAGE SIGNAL PROCESSING DEVICE, IMAGING DEVICE, IMAGE SIGNAL PROCESSING METHOD AND PROGRAM

(75) Inventors: Ryoji Eki, Kanagawa (JP); Eiji Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 12/929,317

(22) Filed: Jan. 14, 2011

(65) Prior Publication Data

US 2011/0194001 A1 Aug. 11, 2011

(30) Foreign Application Priority Data

Feb. 9, 2010 (JP) ................. 2010-026202

(51) Int. Cl.
*H04N 5/213* (2006.01)
*G06K 9/00* (2006.01)

(52) U.S. Cl.
USPC .......................................... 348/241; 382/162

(58) Field of Classification Search
USPC ................. 348/241–256, 263, 268, 270–280, 348/222.1, 223.1; 382/162, 167
See application file for complete search history.

(56) References Cited

U.S. PATENT DOCUMENTS

| 7,656,441 B2* | 2/2010 | Palum et al. ................... 348/241 |
| 7,864,232 B2* | 1/2011 | Kinoshita et al. ............. 348/272 |
| 2007/0146511 A1* | 6/2007 | Kinoshita et al. ............. 348/272 |
| 2009/0122165 A1* | 5/2009 | Kinoshita ....................... 348/241 |
| 2009/0167901 A1* | 7/2009 | Aragaki .......................... 348/241 |
| 2010/0032546 A1 | 2/2010 | Kawano et al. |
| 2010/0090929 A1* | 4/2010 | Tsujimoto ......................... 345/7 |

FOREIGN PATENT DOCUMENTS

| JP | 56-147578 | 11/1981 |
| JP | 2005-278004 | 10/2005 |
| JP | 2008-113236 A | 5/2008 |
| JP | 2009-105488 A | 5/2009 |
| JP | 2009-124282 A | 6/2009 |
| JP | 2010-016419 A | 1/2010 |
| WO | WO-2008/105370 A1 | 9/2008 |

OTHER PUBLICATIONS

Japanese Office Action issued Nov. 12, 2013 for corresponding Japanese Application No. 2010-026202.

* cited by examiner

*Primary Examiner* — Aung S Moe
(74) *Attorney, Agent, or Firm* — Rader, Fishman & Grauer PLLC

(57) ABSTRACT

An image signal processing device includes: a color mixture correction circuit correcting color mixture among pixels arranged in the row and column directions, having plural light receiving units which perform photoelectric conversion and including filters dividing light incident on respective plural light receiving units into plural color components, wherein the color mixture correction circuit performs correction processing to a signal value of a target pixel of color mixture correction by associating respective signal values of neighboring pixels adjacent to the target pixel of color mixture correction with correction parameters unique to an address of each signal.

24 Claims, 26 Drawing Sheets

BAYER ARRANGEMENT

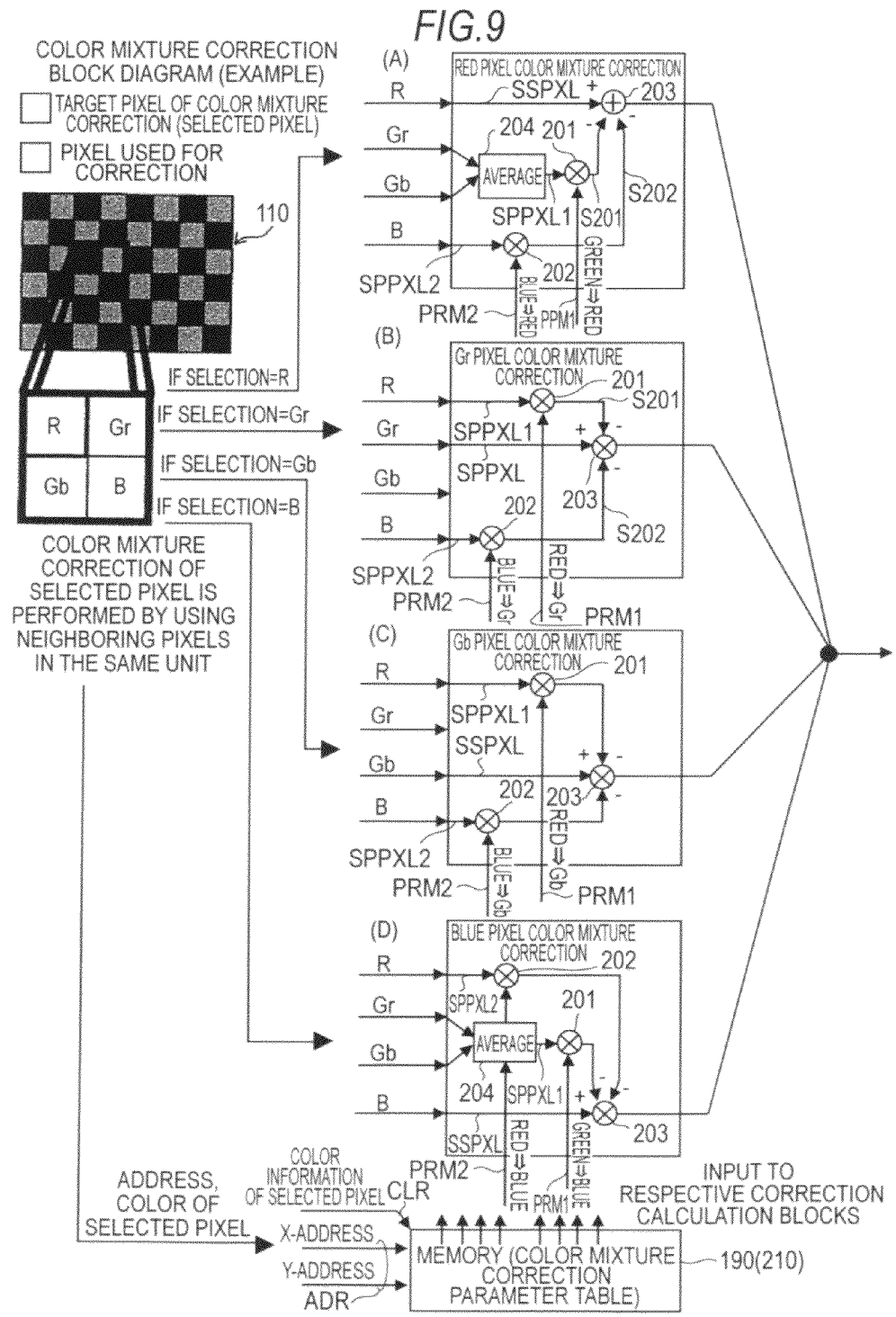

WHEN APPROXIMATED BY ONE INFLECTION POINT AND BY LINEAR FUNCTION

WHEN APPROXIMATED BY TWO INFLECTION POINTS AND BY LINEAR FUNCTION (WITH CLIP OF LOWER LIMIT VALUE)

IDEAL CORRECTION PARAMETER

LINEAR FUNCTION EXPRESSION

*FIG. 24A*

CONFIGURATION OF COLOR FILTERS

*FIG. 24B*

LAYOUT SHAPE DIFFERS IN R1 AND R2

*FIG. 24C*

FIG. 25
1/2 THINNING-OUT PROCESSING
1/2 THINNING-OUT PROCESSING IS ORIGINAL IMAGE
THINNING-OUT PROCESSING
RE-CREATION
WHITE: POSITIONS WHERE PIXELS ARE THINNED OUT
(1) SIGNAL VALUES OF THINNED-OUT PIXELS ARE USED  (2) SIGNAL VALUES OF THINNED-OUT PIXELS ARE NOT USED
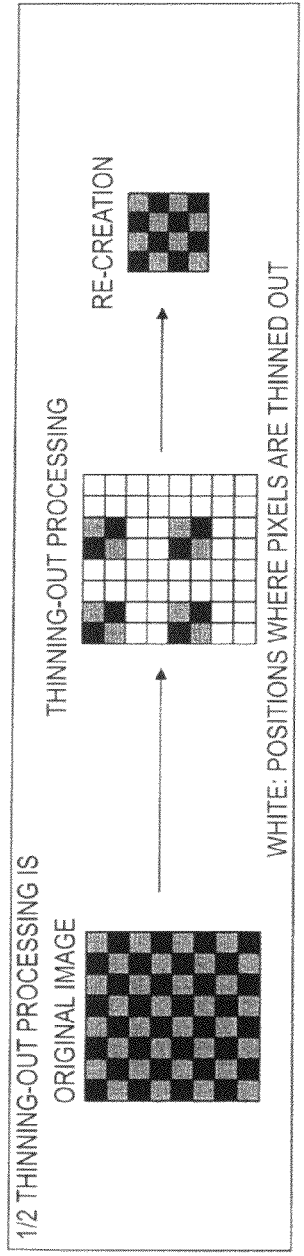
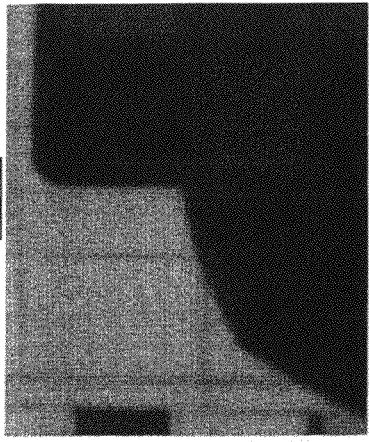
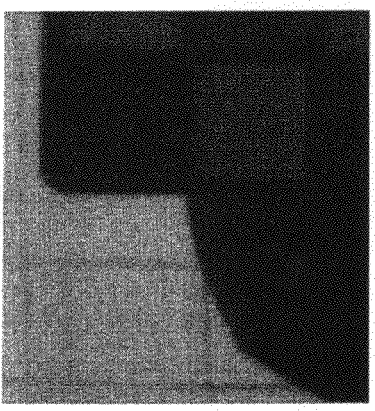
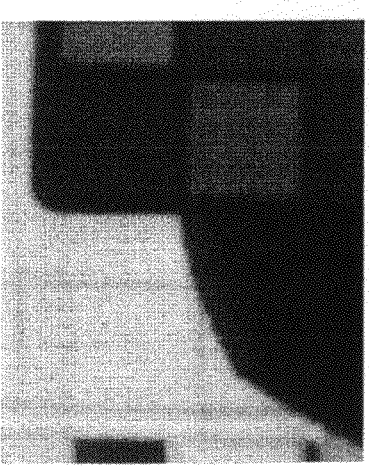
UNPROCESSED
FALSE COLOR OCCURS AT EDGES
FALSE COLOR DOES NOT OCCUR AT EDGES

IMAGE SIGNAL PROCESSING DEVICE, IMAGING DEVICE, IMAGE SIGNAL PROCESSING METHOD AND PROGRAM

BACKGROUND OF THE INVENTION

1. Field of the Invention

The present invention relates to an image signal processing device, an imaging device, an image signal processing method and a program having a function of correcting so-called color mixture in a solid-state imaging device such as a CCD (Charge Coupled Device), a CMOS (Complementary Metal Oxide Semiconductor) sensors using plural color filters.

2. Description of the Related Art

As arrangement of color filters of the imaging device, Bayer arrangement using two greens (G) Gr, Gb, one red (R) and one blue (B) in three primary colors which have good color reproducibility is known.

The Bayer arrangement is an arrangement in which resolution of luminance is regarded as more important than colors.

When a solid-state imaging device having plural light receiving elements on which color filters are formed is used in the solid-state imaging device, light is transmitted through adjacent light receiving elements due to factors such as incident angles and reflection of light after transmitting color filters.

As a result, so-called color mixture occurs, in which a signal value is obtained in a wavelength not in a transmission range of the color filters originally.

Incidentally, a pixel sharing system is commonly applied as a means for miniaturizing pixels.

The number of transistors per one pixel can be reduced by the system. For example, there is a zigzag type four-pixel sharing system (refer to S. Yoshihara, et al., "A 1/1.8-inch 6.4 MPixel 60 frames/s CMOS Image Sensor with Seamless Mode Change" ISSCC Dig. Tech. Papers, pp. 492-493, February, 2006 (Non-Patent Document 1)).

In the case of the sharing system, the same Gr pixel has two-types of layout structures. As the layout structure is different, the color mixture amount will be asymmetric.

The effect appears prominently in applications in which the incident angle is largely inclined to a vertical direction of a sensor surface such as in small modules used in a cellular phone application and so on. There is a need for a highly-accurate correction method which can correct asymmetric property of the color mixture amount along with miniaturization of pixels.

As one of methods of correcting of color mixture, a method in which mixture of a color to be corrected is reduced by multiplying each color of the color filters by a correction coefficient which is equal to all pixels and performs subtraction (refer to JP-A-56-147578 (Patent Document 1)).

Additionally, a method disclosed in JP-A-2005-278004 (Patent Document 2) is known as a correction method having coefficients different according to addresses.

In the method, correction of color mixture is performed by subtracting a value obtained by multiplying a signal value of a pixel adjacent to one side of a target pixel in the horizontal direction by a correction parameter unique to color temperature and an address from a signal value of the target pixel.

Operation expressions are represented by the following expressions and color mixture from the row direction can be corrected.

$$R'(x,y)=R(x,y)-\alpha(x,y) \times Gr(x,y)$$

$$B'(x,y)=B(x,y)-\beta(x,y) \times Gb(x,y)$$

Here, $\alpha(x,y)=R/Gr(x,y)-a(K)$ $\beta(x,y)=B/Gb(x,y)-b(K)$ [Expression 1]

*K represents color temperature

SUMMARY OF THE INVENTION

In the method disclosed in Patent Document 1, there is a problem that the effect of color mixture different according to addresses is not corrected.

As the correction accuracy is insufficient in the configuration having the parameter equal to all pixels, there exists a problem that it is difficult to address deterioration of color mixture occurring along with the miniaturization of pixels.

There is also a problem that it is difficult to address the difference of color mixture between a G-pixel (referred to as Gb from now) in the same row of a B-pixel and a G-pixel (referred to as Gr from now) in the same row as an R-pixel.

In the method disclosed in Patent Document 2, it is difficult to correct color mixture from vertical and oblique directions through the color mixture from the row direction can be corrected, therefore, it is difficult to sufficiently obtain correction accuracy.

In view of the above problem, the method of changing the correction coefficient according to color temperature is applied in Patent Document 2.

However, a system for calculating color temperature is necessary in the method as well as it is necessary to mount a memory for storing correction parameters different according to color temperature, therefore, there is a problem that a circuit scale necessary for correction of color mixture is increased.

There is another problem that deterioration of pixels occurring when difference of color mixture is generated between Gr and Gb due to difference in a layout shape of a layer under color filters becomes prominent because the correction of color mixture is difficult in G-pixels.

In view of the above, it is desirable to provide an image signal processing device, an imaging device, an image signal processing method and a program capable of correcting color mixture different according to addresses, capable of correcting effects of color mixture occurring when the layout shape differs between pixels in color filters having the same color and capable of correcting color mixture not depending on color temperature.

According to an embodiment of the invention, there is provided an image signal processing device including a color mixture correction circuit correcting color mixture among pixels arranged in the row and column directions, having plural light receiving units which perform photoelectric conversion and including filters dividing light incident on respective plural light receiving units into plural color components, in which the color mixture correction circuit performs correction processing to a signal value of a target pixel of color mixture correction by associating respective signal values of neighboring pixels adjacent to the target pixel of color mixture correction with correction parameters unique to an address of each signal.

According to another embodiment of the invention, there is provided an imaging device including an image unit having plural light receiving units arranged in row and column directions so as to form an imaging surface, which perform photoelectric conversion and including filters dividing light incident on respective plural light receiving units into plural color components and an image signal processing device performing image processing to image signals obtained in the image unit, in which the image signal processing device has a color mixture correction circuit correcting color mixture between pixels, and the color mixture correction circuit performs correction processing to a signal value of a target pixel of color mixture correction by associating respective signal values of neighboring pixels adjacent to the target pixel of color mixture correction with correction parameters unique to an address of each signal.

According to still another embodiment of the invention, there is provided an image signal processing method including the step of correcting color mixture among pixels arranged in the row and column directions, having plural light receiving units which perform photoelectric conversion and including filters dividing light incident on respective plural light receiving units into plural color components, in which, in the step of correcting color mixture, correction processing is performed to a signal value of a target pixel of color mixture correction by associating respective signal values of neighboring pixels adjacent to the target pixel of color mixture correction with correction parameters unique to an address of each signal.

According to yet another embodiment of the invention, there is provided a program including color mixture correction processing correcting color mixture among pixels arranged in the row and column directions, having plural light receiving units which perform photoelectric conversion and including filters dividing light incident on respective plural light receiving units into plural color components, in which, in the color mixture correction processing, the program allows a computer to perform image signal processing in which correction processing is performed to a signal value of a target pixel of color mixture correction by associating respective signal values of neighboring pixels adjacent to the target pixel of color mixture correction with correction parameters unique to an address of each signal.

According to the embodiments of the invention, color mixture correction is capable of correcting color mixture different according to addresses, capable of correcting effects of color mixture occurring when the layout shape differs between pixels in color filters having the same color and capable of correcting color mixture not depending on color temperature.

BRIEF DESCRIPTION OF THE DRAWINGS

FIG. 9 is a diagram showing more specific functional configurations of the color mixture correction circuit when the target pixels of color mixture correction are R, Gr, Gb and B;

FIGS. 24A to 24C are views showing examples of color filters, a pixel layout and a pixel circuit when the pixel sharing configuration is applied in each unit of the Bayer arrangement in the pixel unit according to the embodiment;

FIG. 25 is a view showing results of comparing color mixture correction processing when using signal values of thinned-out pixels and when not using the signal values when performing ½ thinning-out processing;

DESCRIPTION OF THE PREFERRED EMBODIMENTS

Hereinafter, embodiments of the invention will be explained with reference to the drawings.

The explanation will be made in the following order.

1. Whole configuration example of an imaging device
2. Configuration and functions of a color-mixture correction circuit
3. Acquisition method of correction parameters
4. Configuration example of a camera system FIG. 1 is a block diagram showing a configuration example of a solid-state imaging device (CMOS image sensor) according to an embodiment of the invention.

Figure 1:
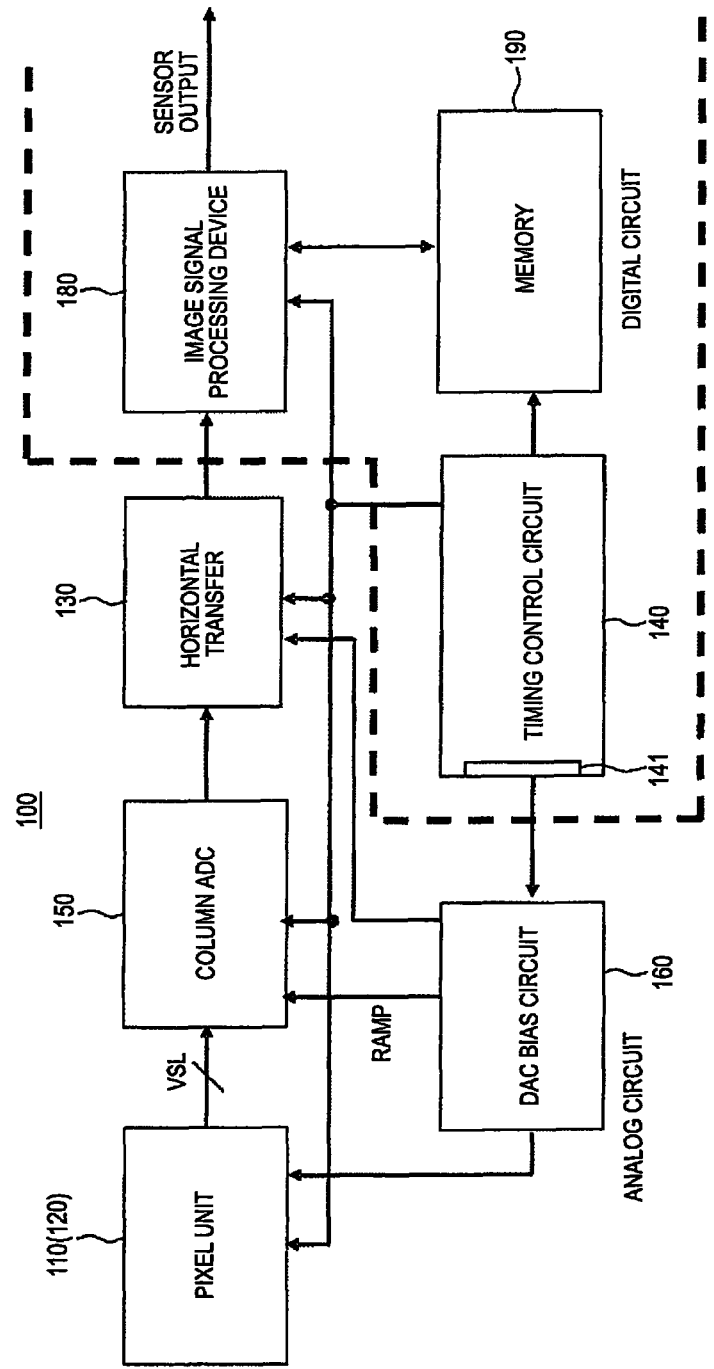
FIG. 1 is a block diagram showing a configuration example of a solid-state imaging device (CMOS image sensor) according to an embodiment of the invention.
Figure 2:
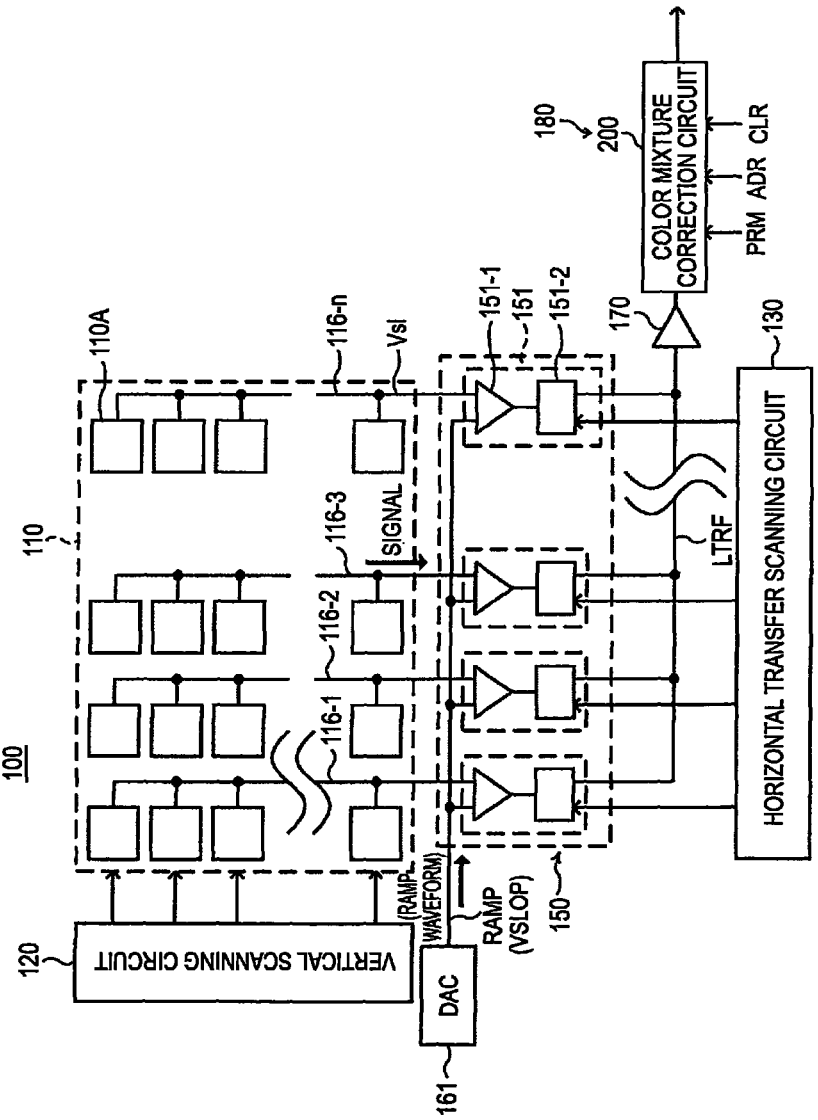
FIG. 2 is a block diagram showing a relevant part including an ADC group in the solid-state imaging device (CMOS image sensor) of FIG. 1.

FIG. 2 is a block diagram showing a relevant part including an ADC group in the solid-state imaging device (CMOS image sensor) of FIG. 1.

<1. Whole Configuration Example of the Solid-State Imaging Device>

A solid-state imaging device 100 includes a pixel unit 110 as an imaging unit, a vertical scanning circuit 120, a horizontal transfer scanning circuit 130 and a timing control circuit 140 as shown in FIG. 1 and FIG. 2.

The solid-state imaging device 100 also includes a column processing circuit group 150 which is an ADC (analog/digital converter) group as a pixel signal reading circuit and a DAC bias circuit 160 including a DAC (digital/analog converter) 161.

The solid-state imaging device 100 further includes an amplifier circuit (S/A) 170, an image signal processing device 180 and a memory 190.

In the above components, the pixel unit 110, the vertical scanning circuit 120, the horizontal transfer scanning circuit 130, the column processing circuit group (ADC group) 150, the DAC bias circuit 160 and the amplifier circuit 170 are formed by analog circuits.

The timing control circuit 140, the image signal processing device 180 and the memory 190 are formed by digital circuits.

In the solid-state imaging device 100 according to the embodiment, the image signal processing device 180 of a subsequent stage is connected to an output of the amplifier circuit 170.

In the signal processing circuit 180, correction of color mixture, white balance processing, correction of vertical line defects or dot defects and signal clamping are performed by signals stored in the memory 190 as well as digital signal processing such as parallel/serial conversion, compression, encoding, addition, average and intermittent operation is performed.

The image signal processing device 180 performs color mixture correction processing when a color mixture correction parameter PRM, address information ADR and color information CLR are supplied as shown in FIG. 2.

The image signal processing device 180 includes a color mixture correction circuit 200 performing correction of color mixture not depending on color temperature by subtracting a value obtained by multiplying signal values of pixels adjacent to a target pixel of color mixture correction by the correction parameter unique to an address from a signal value of the target pixel of color mixture correction.

The color mixture correction circuit 200 performs color mixture correction operation before operation of automatic white balance processing.

A specific configuration and functions of the color mixture correction circuit 200 will be described later.

Digital signals transmitted by respective pixel rows are stored in the memory 190.

For example, the address information ADR and the color information CLR are given to the memory 190 as well as color mixture correction parameters PRM for performing color mixture correction set in a table are supplied to the color mixture correction circuit 200.

Hereinafter, a specific configuration and functions of the color mixture correction circuit 200 will be explained after explaining the summary of a configuration of functions of the imaging device 100.

In the pixel unit 110, plural unit pixels 110A each having a photodiode (photoelectric conversion element) as a light receiving unit and a pixel amplifier are arranged two-dimensionally (in a matrix state) of m-rows×n-columns.

In the pixel unit 110, pixels are arranged in row and column directions to form an imaging surface, having plural number of light receiving units which perform photoelectric conversion and filters dividing light incident on plural respective light receiving units into plural color components.

Figure 3:
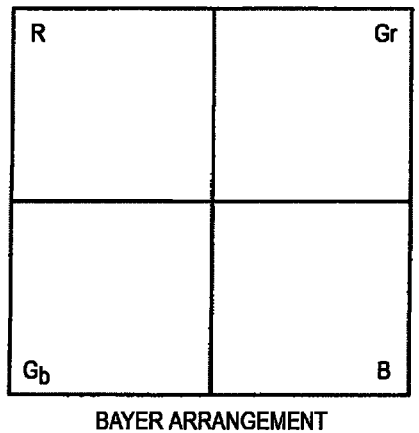
FIG. 3 is a view showing a unit of Bayer arrangement as a pixel arrangement example.

As pixel arrangement of the pixel unit 110, for example, Bayer arrangement is applied as shown in FIG. 3.

That is, as the arrangement of color filters of the imaging device 100, the Bayer arrangement using two greens (Gr, Gb), one red (R) and one blue (B) in three primary colors which have good color reproducibility is known.

Figure 4:
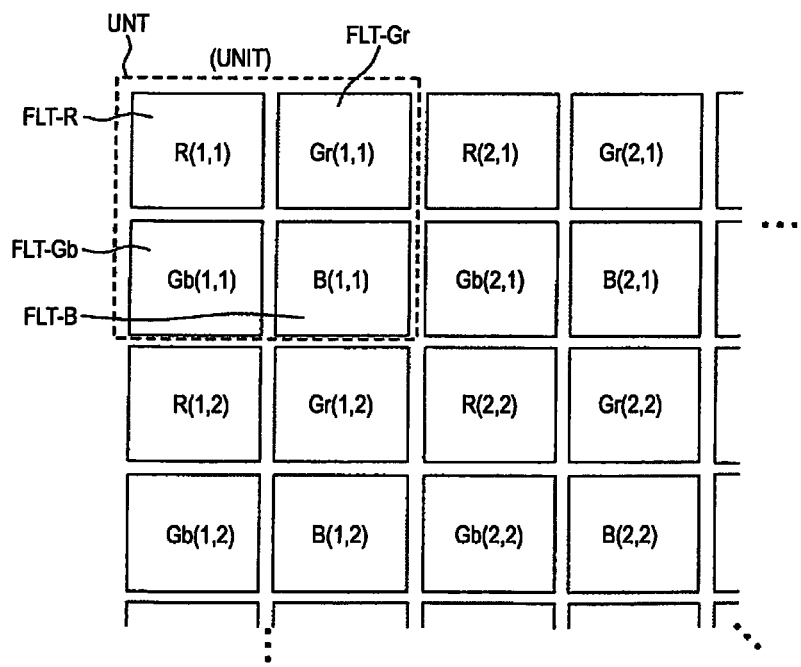
FIG. 4 is a view showing an example in which units of Bayer arrangement of FIG. 3 are arranged in a matrix state.

In the pixel unit 110, the Bayer arrangement shown in FIG. 3 is taken as the minimum unit UNT, and the units UNT are arranged in the matrix state as shown in FIG. 4.

The pixel unit 110 includes an effective pixel region including plural effective pixels having filters FLT of respective colors RGB and a blanking region.

[Configuration Example of the Unit Pixel]

Figure 5:
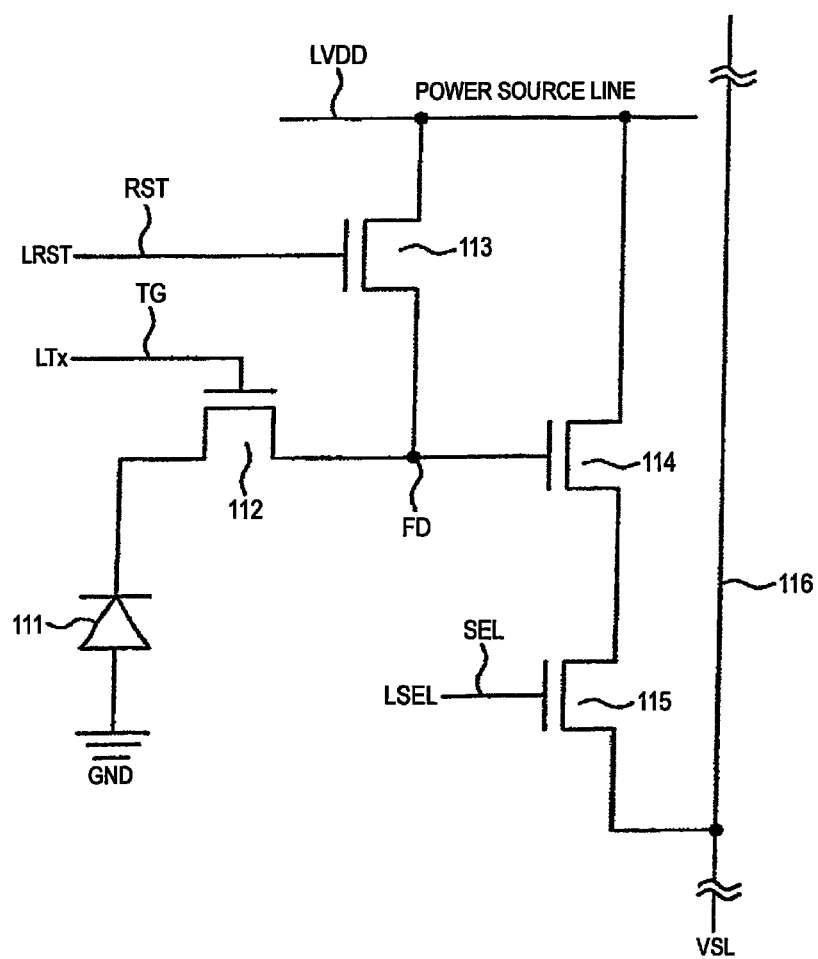
FIG. 5 is a circuit diagram showing a configuration example of a unit pixel in a pixel unit according to the embodiment.

FIG. 5 is a diagram showing an example of a pixel in a CMOS image sensor including four transistors according to the embodiment.

The unit pixel 110A includes, for example, a photodiode 111 as a photoelectric conversion element.

The unit pixel 110A includes four transistors as active elements, which are a transfer transistor 112 as a transfer element, a reset transistor 113 as a reset element, an amplifier transistor 114 and a selection transistor 115 with respect to one photodiode 111.

The photodiode 111 photoelectrically converts incident light into charges (electrons in this case) corresponding to the light amount.

The transfer transistor 112 is connected between the photodiode 111 and a floating diffusion FD as an output node.

The transfer transistor 112 transfers electrons photoelectrically converted by the photodiode 111 as the photoelectric conversion element to the floating diffusion FD when a drive signal TG is given to a gate (transfer gate) of the transistor through a transfer control line LTx.

The reset transistor 113 is connected between a power source line LVDD and the floating diffusion FD.

The reset transistor 113 resets a potential of the floating diffusion FD to a potential of the power source line LVDD when a reset RST is given to a gate of the transistor through a reset control line LRST.

A gate of the amplifier transistor 114 is connected to the floating diffusion FD. The amplifier transistor 114 is connected to a vertical signal line 116 through the selection transistor 115, which configures a source follower with a constant current source which is outside the pixel.

Then, a control signal (an address signal or a select signal) SEL is given to a gate of the selection transistor 115 through a selection control line LSEL to turn on the selection transistor 115.

When the selection transistor 115 is turned on, the amplifier transistor 114 amplifies the potential of the floating diffusion FD and outputs the voltage corresponding to the potential to the vertical signal line 116. The voltage outputted from each pixel through the vertical signal line 116 is outputted to the column processing circuit group 150 as a pixel signal reading circuit.

These operations are simultaneously performed in respective pixels of one row in parallel because respective gates of, for example, the transfer transistor 112, the reset transistor 113 and the selection transistor 115 are connected in each row.

The reset control line LRST, the transfer control line LTx and the selection control line LSEL arranged as a set in the pixel unit 110 are wired in each row of pixel arrangement.

These reset control line LRST, the transfer control line LTx and the selection control line LSEL are driven by the vertical scanning circuit 120 as a pixel drive unit.

In the solid-state imaging device 100, the timing control circuit 140 generating an internal clock as a control circuit for sequentially reading signals of the pixel unit 110, the vertical scanning circuit 120 controlling row addresses and row scanning, and the horizontal transfer scanning circuit 130 controlling column addresses and column scanning are arranged.

The timing control circuit 140 generates timing signals necessary for signal processing in the pixel unit 110, the vertical scanning circuit 120, the horizontal transfer scanning circuit 130, the column processing circuit group 150, the DAC bias circuit 160, the signal processing circuit 180 and the memory 190.

In the pixel unit 110, video or screen images are photoelectrically converted in each pixel row by accumulation and discharge of photons using a line shutter, and analog signals VSL are outputted to respective column processing circuits 151 of the column processing group 150.

In the ADC group 150, analog outputs from the pixel unit 110 are converted by integrating-type ADCs with a APGA using a reference signal (ramp signal) RAMP from the DAC 161 at ADC blocks (respective column units) respectively as well as digital CDS is performed to output digital signals of several bits.

The DAC 161 generates the reference signal (RAMP signal) which has a slope waveform linearly changing with a given slope and supplies the reference signal RAMP to the column processing control circuit group 150 under control of a DAC control unit 141.

[Configuration Example of a Column ADC]

In the column processing circuit group 150 according to the embodiment, plural columns of column processing circuits (ADC) 151 are arranged as the ADC block.

That is, the column processing circuit group 150 includes a k-bit digital signal conversion function, which is arranged at respective vertical signal lines (column lines) 116-1 to 116-n to form a column-parallel ADC block.

Each ADC 151 includes a comparator 151-1 comparing a reference signal RAMP (Vslop) which has the ramp waveform obtained by changing the reference signal generated by the DAC 161 in a staircase pattern with an analog signal Vsl obtained from pixels of each row through the vertical signal line.

Each ADC 151 further includes a counter latch 151-2 counting comparison time and store counted results.

Outputs of respective counter latches 151-2 are connected to a horizontal transfer line LTRF having, for example, a k-bit width.

Then, k-pieces of amplifier circuits 170 and the image signal processing devices 180 corresponding to the horizontal transfer lines LTRF.

In the ADC group 150, the analog signal potential Vsl read to the vertical signal lines 116 is compared with the ramp signal Vslop (the ramp signal RAMP having a slope waveform linearly changing with a given slope) at comparators 151-1 arranged in respective columns.

At this time, the counter latches 151-2 arranged at respective columns in the same manner as the comparators 151-1 are operated.

Each ADC 151 converts the potential Vs1 of the vertical signal line 116 (analog signal) into a digital signal by variation of the reference signal RAMP (potential Vslop) having the ramp waveform and the counter value which are associated with each other.

The ADC 151 converts variation of voltage of the reference signal RAMP (potential Vslop) into variation of time and counts the time by a given cycle (clock) to be converted into a digital signal.

When the analog signal Vsl intersect with the reference signal RAMP (Vslop), the output of the comparator 151-1 is inverted and the input clock of the counter latch 151-2 is stopped or the clock the input of which has been stopped is inputted to the counter latch 151-2 to thereby complete AD conversion.

After the AD conversion period is completed, data stored in the counter latches 151-2 is transferred to the horizontal transfer lines LTRF by the horizontal transfer scanning circuit 130 and inputted into the image signal processing devices 180 through the amplifier circuits 170 to thereby generate a two-dimensional image by given signal processing.

In the horizontal transfer scanning circuit 130, simultaneous parallel transfer at several channels is performed for securing transfer speed.

The timing control circuit 140 generates timings necessary for signal processing at respective blocks such as the pixel unit 110 and the column processing circuit group 150.

In the signal processing circuit 180, correction of color mixture, white balance processing, correction of vertical line defects or dot defects and signal clamping are performed by signals stored in the memory 190 as well as digital signal processing such as parallel/serial conversion, compression, encoding, addition, average and intermittent operation is performed.

The memory 190 also stores digital signals transmitted in units of respective pixel rows.

Additionally, for example, address information ADR and color information CLR are given to the memory 190, and the color mixture correction parameters PRM for performing color mixture correction which are set in the table are supplied to the color mixture correction circuit 200.

In the solid-state imaging device 100 according to the embodiment, digital outputs of the image signal processing devices 180 are transmitted as inputs of an ISP or a baseband LSI.

<2. Configuration and Functions of the Color Mixture Correction Circuit>

The configuration and functions of the color mixture correction circuit 200 according to the embodiment will be specifically explained below. Here, operation processing for correcting color mixture on color filters in the solid-state imaging device 100 will be chiefly explained.

The color mixture correction circuit 200 has a function of performing correction processing to a signal value of the target pixel of color mixture correction by using (associating) respective signal values of neighboring pixels adjacent to the target pixel of color mixture correction and (with) the correction parameter unique to the address of each signal.

The color mixture correction circuit 200 applies pixels adjacent to the target pixel of color mixture correction in the horizontal direction as well as the vertical direction of pixel arrangement or in the horizontal direction as well as the oblique direction or in the horizontal direction as well as the vertical direction as well as the oblique direction as neighboring pixels adjacent to the target pixel of color mixture correction.

The color mixture correction circuit 200 has a function of performing operation of color mixture correction for pixels including color filters of the same color by using correction parameters different according to the arrangement of color filters on the adjacent neighboring pixels.

The color mixture correction circuit 200 has a function of performing operation of color mixture correction for pixels including color filters of the same color by using correction parameters different according to a layout shape of a layer under the color filters.

The color mixture correction circuit 200 has a function of using the correction parameters approximated to polynomials with the address of the target pixel of color mixture correction as variables, and storing coefficients in the polynomials in the memory 190.

In this case, the color mixture correction circuit 200 has a function of clipping correction parameters at the upper limit value or the lower limit value in the polynomial with the address as variables, storing the value at which clipping is performed in the memory 190.

The color mixture correction circuit 200 has a function of dividing the parameter into $(i+1)^2$ areas with i-inflection points and by applying polynomials with the address as variables in respective areas, storing coefficients of the polynomials in the memory 190.

The color filters in pixels to be photoelectric conversion units according to the embodiment will be arranged as shown in FIG. 3, which is described above as an example.

That is, the Bayer arrangement is applied in the embodiment, in which R (red), G (Gr) adjacent to R in the row direction, B (blue) and G (Gb) adjacent to B in the row direction form the minimum unit UNT having the same address as an example.

Then, the color mixture correction is made by performing calculation in each address by using the following equation.

$$\begin{pmatrix} R'(x, y) \\ Gr'(x, y) \\ Gb'(x, y) \\ B'(x, y) \end{pmatrix} = \text{[Expression 2]}$$

$$\begin{pmatrix} a11(x, y) & a12(x, y) & a13(x, y) & a14(x, y) \\ a21(x, y) & a22(x, y) & a23(x, y) & a24(x, y) \\ a31(x, y) & a32(x, y) & a33(x, y) & a34(x, y) \\ a41(x, y) & a42(x, y) & a43(x, y) & a44(x, y) \end{pmatrix} \times$$

$$\begin{pmatrix} R(x, y) \\ Gr(x, y) \\ Gb(x, y) \\ B(x, y) \end{pmatrix}$$

[Background of Color Mixture Correction]

The reason that the color mixture correction is performed as described above is as follows.

Figure 6:
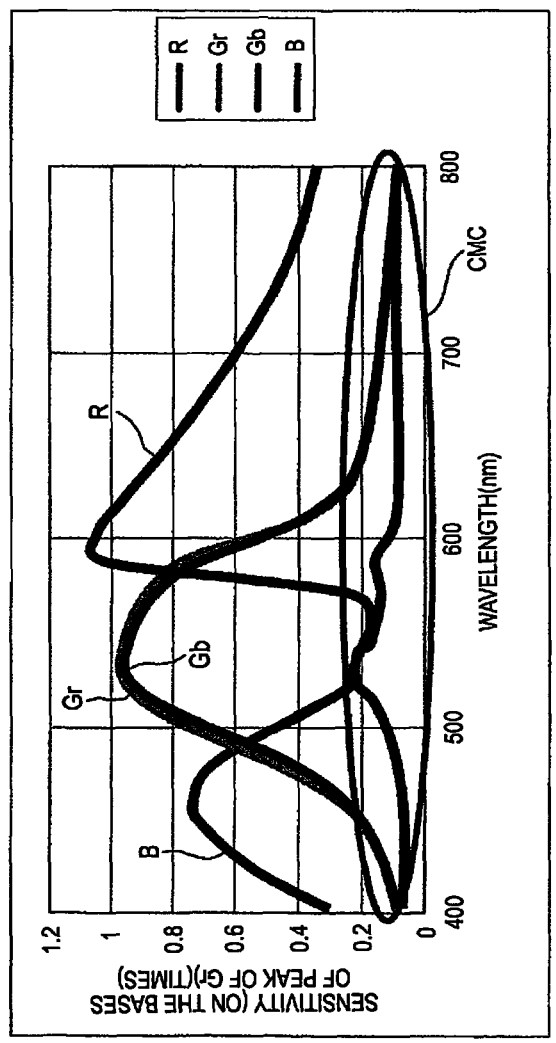
FIG. 6 is a graph conceptually showing spectral characteristics of respective color filter pixels R, Gr, Gb and B.

FIG. 6 is a graph conceptually showing spectral characteristics of respective color filter pixels R, Gr, Gb and B.

In FIG. 6, the horizontal axis represents the wavelength and the vertical axis represents the relative sensitivity, respectively.

Figure 7:
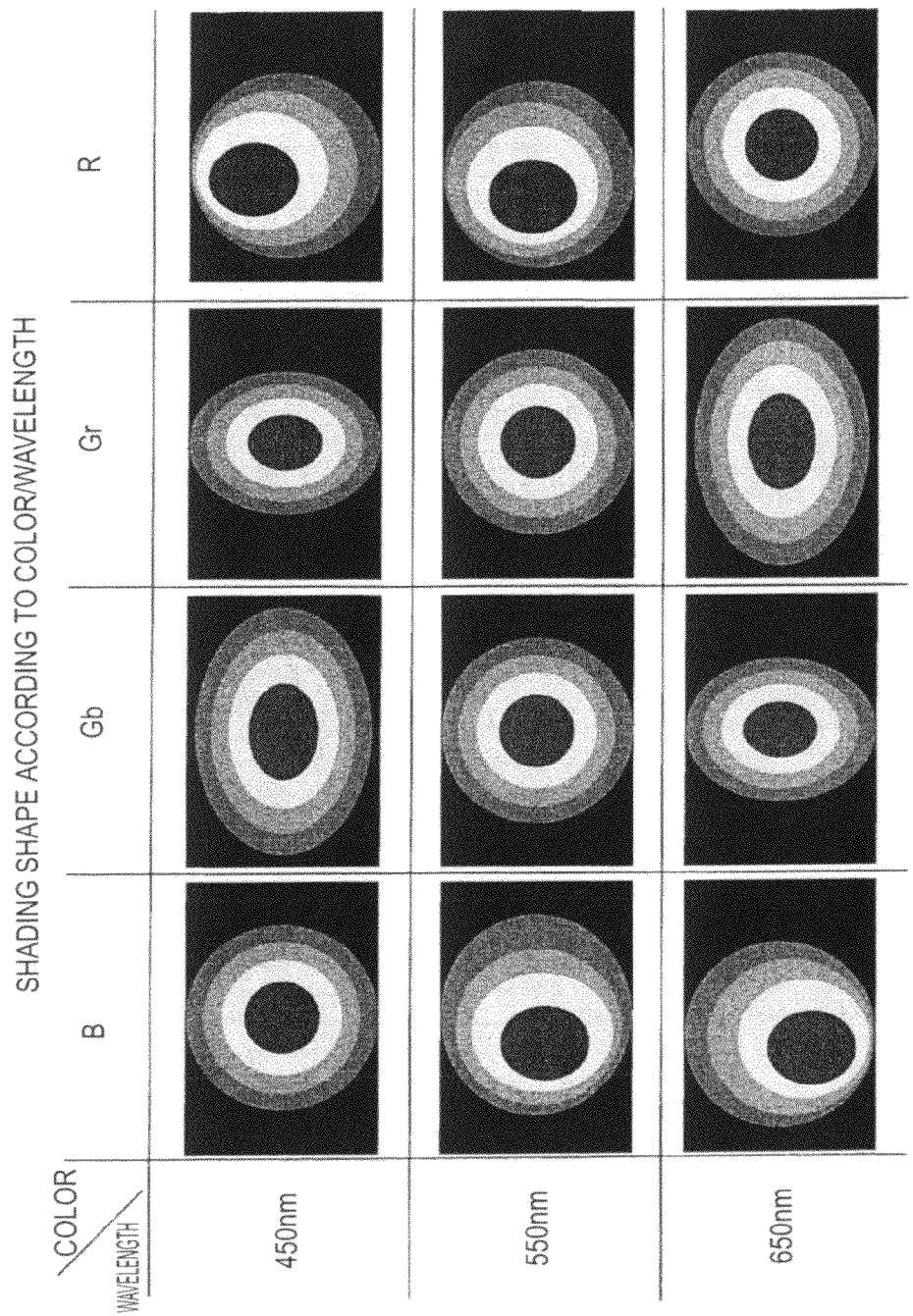
FIG. 7 is a view showing examples of shading shapes in respective wavelengths.

FIG. 7 is a view showing examples of shading shapes in respective wavelengths.

As shown in FIG. 6, light is transmitted to adjacent light receiving elements due to factors such as incident angles or reflection of light after transmitting through color filters.

As a result, a so-called color mixture component CMC is generated, in which a signal value is obtained in a wavelength not in the transmission range of the color filters originally.

The shading shape differs due to effects of color mixture as shown in FIG. 7.

Here, problems arise in two points.

First, the color mixture component differs according to addresses.

Secondly, the shading shape differs in Gr and Gb.

In the embodiment, the color mixture correction is basically made by performing operation in each address by using the expression shown in the above Expression 2.

Features of the operation are as follows.

The operation is performed by using a coefficient unique to each pixel. Accordingly, color shading can be corrected not depending on color temperature.

Concerning "G", "Gr" and "Gb" are separately calculated. Accordingly, color shading correction with higher precision can be performed.

The correction parameters different according to addresses are used after the parameters are approximated. Accordingly, it is possible to reduce the memory capacity.

A configuration example of a color mixture correction circuit, an acquisition method (calculation method) of correction parameters, approximation processing of correction parameters to a linear function and so on will be specifically explained below.

[Basic Configuration of Color Mixture Correction Circuit]

Figure 8:
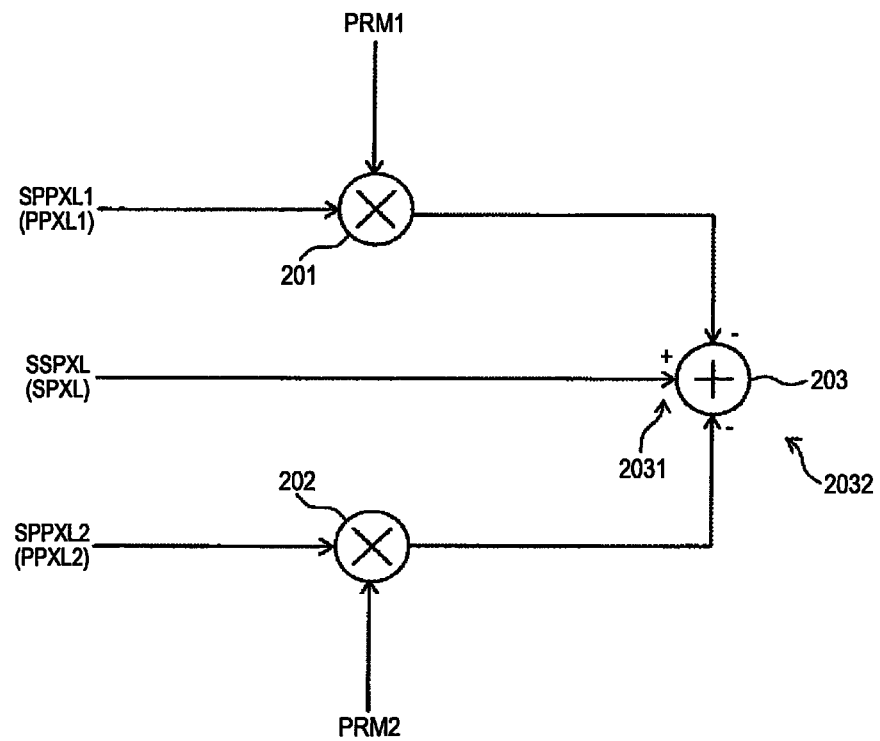
FIG. 8 is a diagram showing a basic configuration of an operation processing system in a color mixture correction circuit according to the embodiment.

FIG. 8 is a diagram showing a basic configuration of an operation processing system in the color mixture correction circuit according to the embodiment.

In principle, the color mixture correction circuit 200 includes multipliers 201, 202 and an adder/subtractor 203.

The multiplier 201 multiplies an output signal SPPXL1 corresponding to one neighboring pixel PPXL1 adjacent to a target pixel of color mixture correction SPXL by a correction parameter PRM1 unique to an address.

The multiplier 202 multiplies an output signal SPPXL2 corresponding to one neighboring pixel PPXL2 adjacent to the target pixel of color mixture correction SPXL by a correction parameter PRM2 unique to an address.

The adder/subtractor 203 includes an adder unit 2031 and a subtractor unit 2032.

The adder unit 2031 adds output signals S201, S202 from the multipliers 201, 202 to a signal SSPXL of the target pixel of color mixture correction SPXL to made a correction signal.

The subtractor unit 2032 takes a difference between the signal value SSPXL of the target pixel of color mixture correction SPXL and an output correction signal from the adder unit 2031.

In the arrangement of FIG. 3, R, Gr, Gb and B can be taken as the target pixel of color mixture correction SPXL.

FIG. 9 is a diagram showing more specific functional configurations of the color mixture correction circuit when the target pixels of color mixture correction are R, Gr, Gb and B.

When the target pixel of color mixture correction SPXL is "R", a signal obtained by averaging values of Gr, Gb by an averaging circuit 204 is applied as the output signal SPPXL1 corresponding to one neighboring pixel PPXL1 adjacent to the target pixel of color mixture correction SPXL (R) as shown in (A) in FIG. 9.

The signal SPPXL1 is multiplied by the correction parameter PRM1 in the multiplier 201 and the signal S201 is outputted to the adder/subtractor 203.

Then, the signal of "B" is applied as the output signal SPPXL2 corresponding to the other neighboring PPXL2 adjacent to the target pixel of color mixture correction SPXL (R).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (R) and the output correction signal is taken.

When the target pixel of color mixture correction SPXL is "Gr", the signal of "R" is applied as the output signal SPPXL1 corresponding to one neighboring pixel PPXL1 adjacent to the target pixel of color mixture correction SPXL (Gr) as shown in (B) in FIG. 9.

The signal SPPXL1 is multiplied by the correction parameter PRM1 in the multiplier 201 and the signal S201 is outputted to the adder/subtractor 203.

Also, the signal of B is applied as the output signal SPPXL2 corresponding to the other neighboring pixel PPXL2 adjacent to the target pixel of color mixture correction SPXL (Gr).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (Gr) and the output correction signal is taken.

When the target pixel of color mixture correction SPXL is "Gb", the signal of "R" is applied as the output signal SPPXL1 corresponding to one neighboring pixel PPXL1 adjacent to the target pixel of color mixture correction SPXL (Gb) as shown in (C) FIG. 9.

The signal SPPXL1 is multiplied by the correction parameter PRM1 in the multiplier 201 and the signal S201 is outputted to the adder/subtractor 203.

Also, the signal of B is applied as the output signal SPPXL2 corresponding to the other neighboring pixel PPXL2 adjacent to the target pixel of color mixture correction SPXL (Gb).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (Gb) and the output correction signal is taken.

When the target pixel of color mixture correction SPXL is "B", a signal obtained by averaging values of Gr, Gb by the averaging circuit 204 is applied as the output signal SPPXL1 corresponding to one neighboring pixel PPXL1 adjacent to the target pixel of color mixture correction SPXL (B) as shown in (D) in FIG. 9.

The signal SPPXL1 is multiplied by the correction parameter PRM1 in the multiplier 201 and the signal S201 is outputted to the adder/subtractor 203.

Then, the signal of "R" is applied as the output signal SPPLX2 corresponding to the other neighboring PPXL2 adjacent to the target pixel of color mixture correction SPXL (B).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (B) and the output correction signal is taken.

<3. Acquisition Method of Correction Parameters>

Here, a calculation method of correction parameters in Expression 2 will be shown.

In the method, sensitivity response of pixels on which color filters of respective colors are arranged is measured by spectral measurement.

The wavelength dependence of sensitivity output in a B (Blue) pixel, a G (Green) pixel and an R (Red) pixel is obtained from the spectral measurement result.

Next, amounts of color mixture from respective pixels are calculated. For example, when the amount of color mixture from the B pixel ($a41(x, y)$, $a42(x, y)$ and $a43(x, y)$ in Expression 2) is calculated, a wavelength when the signal value of B is sufficiently higher than the signal value of the G and R pixels (for example, 450 nm).

The sensitivity in G and R pixels will be a color mixture component from the B pixel in the wavelength range.

The single-wavelength measurement is performed in the wavelength range to thereby obtain in-plane distribution of the amounts of color mixture from the B pixel to R, Gr and Gb. The following operation is performed from the in-plane distribution.

$$a41(x,y) = R(x,y)@450 \text{ nm}/B(x,y)@450 \text{ nm}$$

$$a42(x,y) = Gr(x,y)@450 \text{ nm}/B(x,y)@450 \text{ nm}$$

$$a43(x,y) = Gb(x,y)@450 \text{ nm}/B(x,y)@450 \text{ nm} \quad \text{[Expression 3]}$$

R (x, y): signal value of the R pixel in address (x, y) (Same in Gr, Gb and B)

The above represent correction parameters unique to the address from the B pixel.

In the same manner, the amounts of color mixture from R and G pixels are calculated, thereby acquiring correction parameters unique to the color of color filters and the address.

[Approximation of Correction Parameters]

Next, the correction parameters unique to the address obtained by measurement are approximated to polynomials outside a chip.

The correction parameter is divided into $(i+1)^2$ areas with i-inflection points and approximated to polynomials with the address as variables in respective areas.

Moreover, correction parameters are clipped when exceeding the upper limit value or the lower limit value. The inflection points, coefficients of the polynomials, the upper limit value and the lower limit value are stored in an on-chip memory.

Figure 10A:
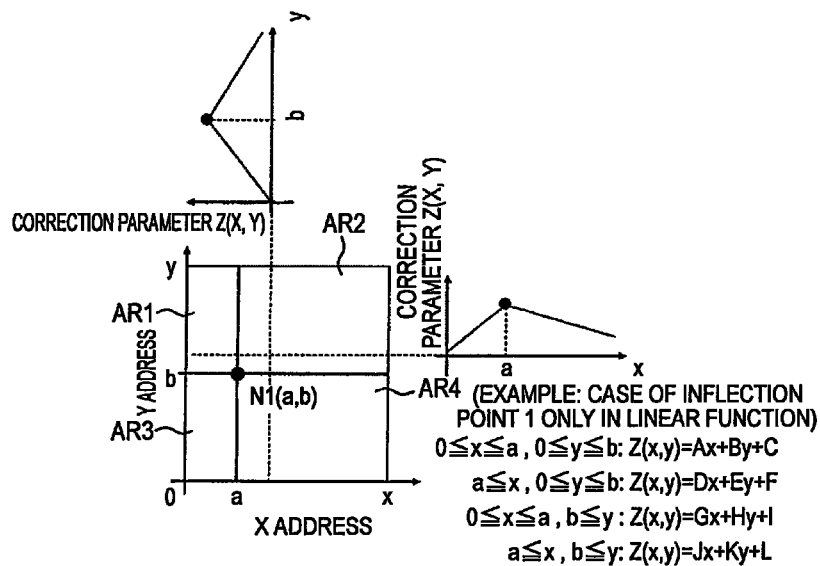
FIGS. 10A and 10B are diagrams showing examples of approximation of correction parameters unique to an address.
Figure 10B:
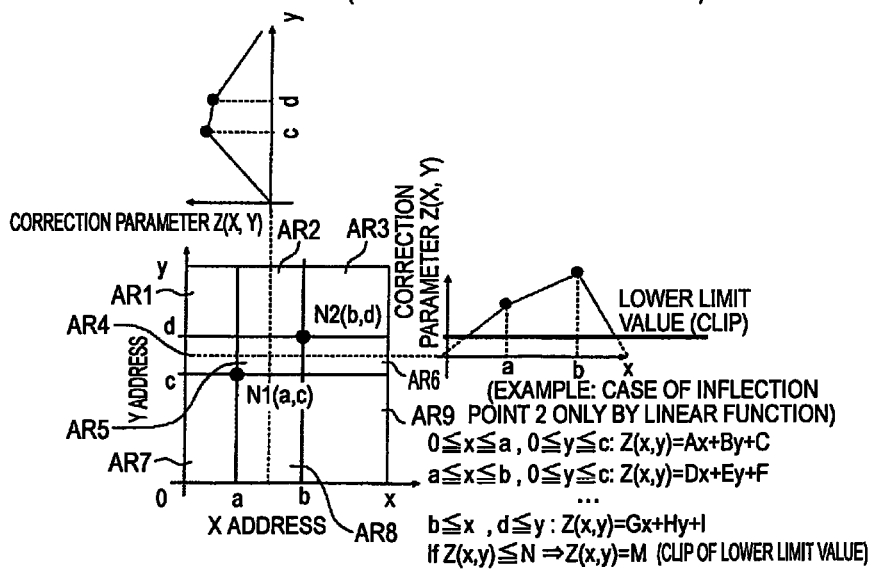

FIGS. 10A and 10B are diagrams showing examples of approximation of the correction parameters unique to the address.

FIG. 10A shows a case in which one inflection point is applied and parameters are approximated only by the linear function.

Values of an inflection point N(a, b) and coefficients ABC-DEFGHIJKL in approximate polynomials Z(x, y) of the correction parameters in the drawing are stored in the memory 190.

The values to be stored in the memory 190 are one inflection point and twelve coefficients in the approximate polynomials.

As the inflection point is one, the parameter is divided into four areas AR1 to AR4 and approximated to polynomials with the address as variables in respective areas AR1 to AR4.

FIG. 10B shows a case in which two inflection points are applied and parameters are approximated only by the linear function.

Values of inflection points N1(a, c), N2(b, d) and coefficients ABCDEFGHI in approximate polynomials Z(x, y) of the correction parameters in the drawing are stored in the memory 190.

The values to be stored in the memory 190 are two inflection points and twenty-seven coefficients in the approximate polynomials.

As the number of inflection points is two, the parameter is divided into nine areas AR1 to AR9 and approximated to polynomials having the address as variables in respective areas AR1 to AR9.

When the number of inflection points is "i", the number of values stored in the memory 190 when approximated by the linear function will be i-variable points and $3(i+1)^2$ coefficients of the approximate polynomials.

When the upper limit value or the lower limit value is clipped as shown in FIG. 10B, a value M is stored in the memory 190.

Figure 11A:
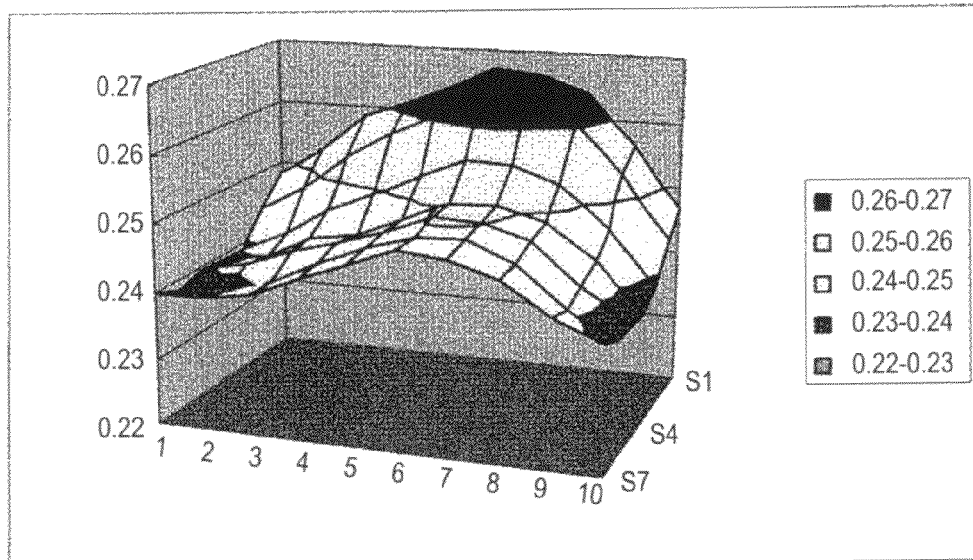
FIGS. 11A and 11B are views showing examples in which ideal color-mixture correction parameters are expressed by a linear function.
Figure 11B:
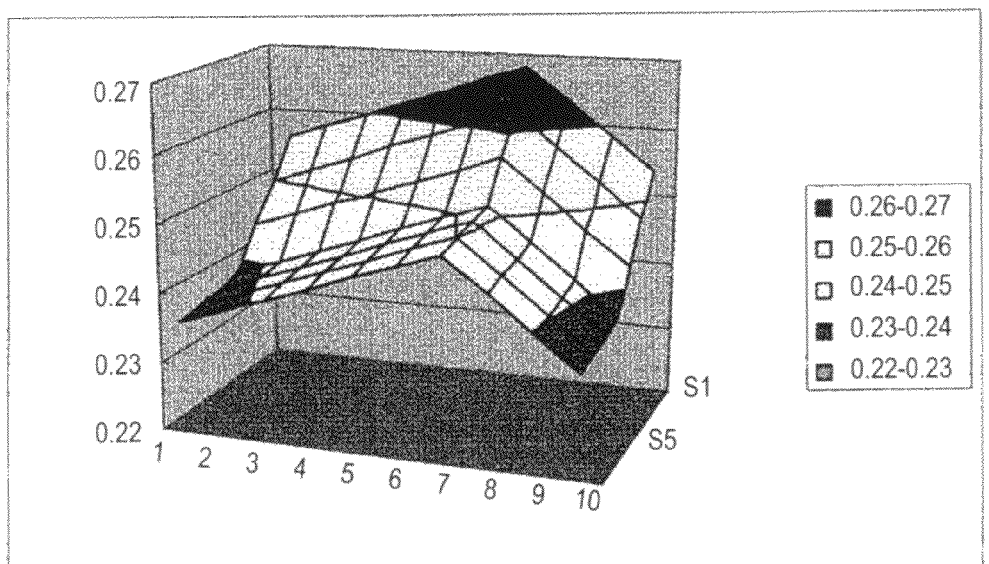

FIGS. 11A and 11B are views showing examples in which ideal color-mixture correction parameters are expressed by the linear function.

FIG. 11A shows an example of ideal correction parameters and FIG. 11B shows an example in which parameters are expressed by the linear function.

When parameters unique to the address are prepared with respect to all pixels, an on-chip memory with enormous capacity will be necessary.

Accordingly, the ideal color-mixture correction parameters are expressed by the linear function to reduce the memory capacity.

Figure 12:
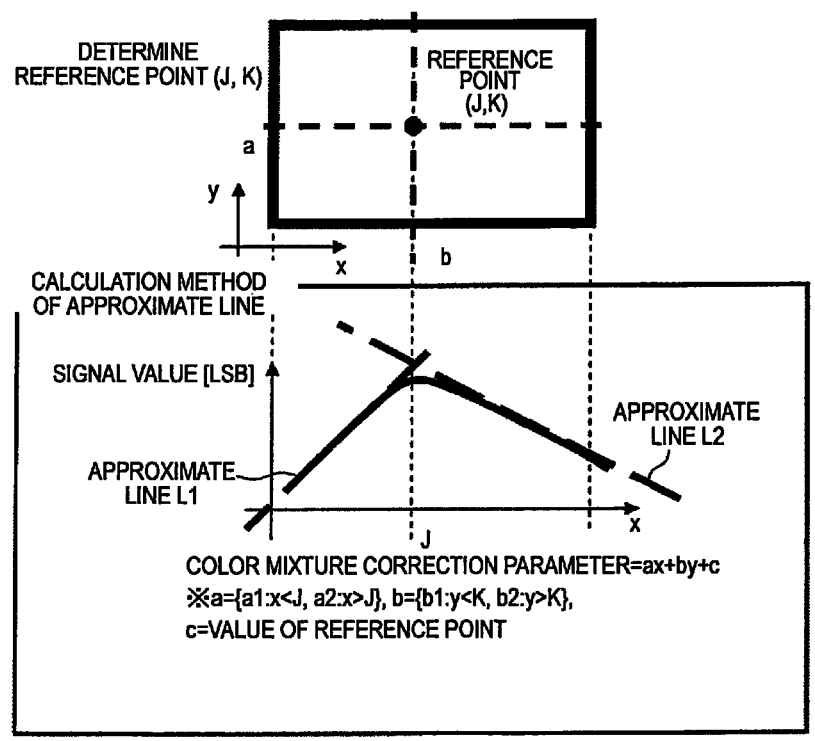
FIG. 12 is a view schematically showing approximation processing of the color-mixture correction parameters to the linear function.

FIG. 12 is a view schematically showing approximation processing of the color-mixture correction parameters to the linear function.

As shown in FIG. 12, a reference point (J, K) corresponding to the inflection point is determined to calculate approximate lines L1, L2.

In the example, the color mixture correction parameter PRM is represented by the following expression.

$$PRM = ax + bx + c \qquad \text{[Expression 4]}$$

A coefficient "a" will be "a1" when x<J, and "a2" when x>J. A coefficient "b" will be "b1" when y<K, and "b2" when y>K. "c" is a value of the reference point.

Therefore, the number of coefficients necessary for one table will be seven.

That is, the number of necessary coefficients for one table is seven in total in which four gradient coefficients, one constant and two coefficients for clipping of the lower limit value and clipping of the upper limit value.

Figure 13:
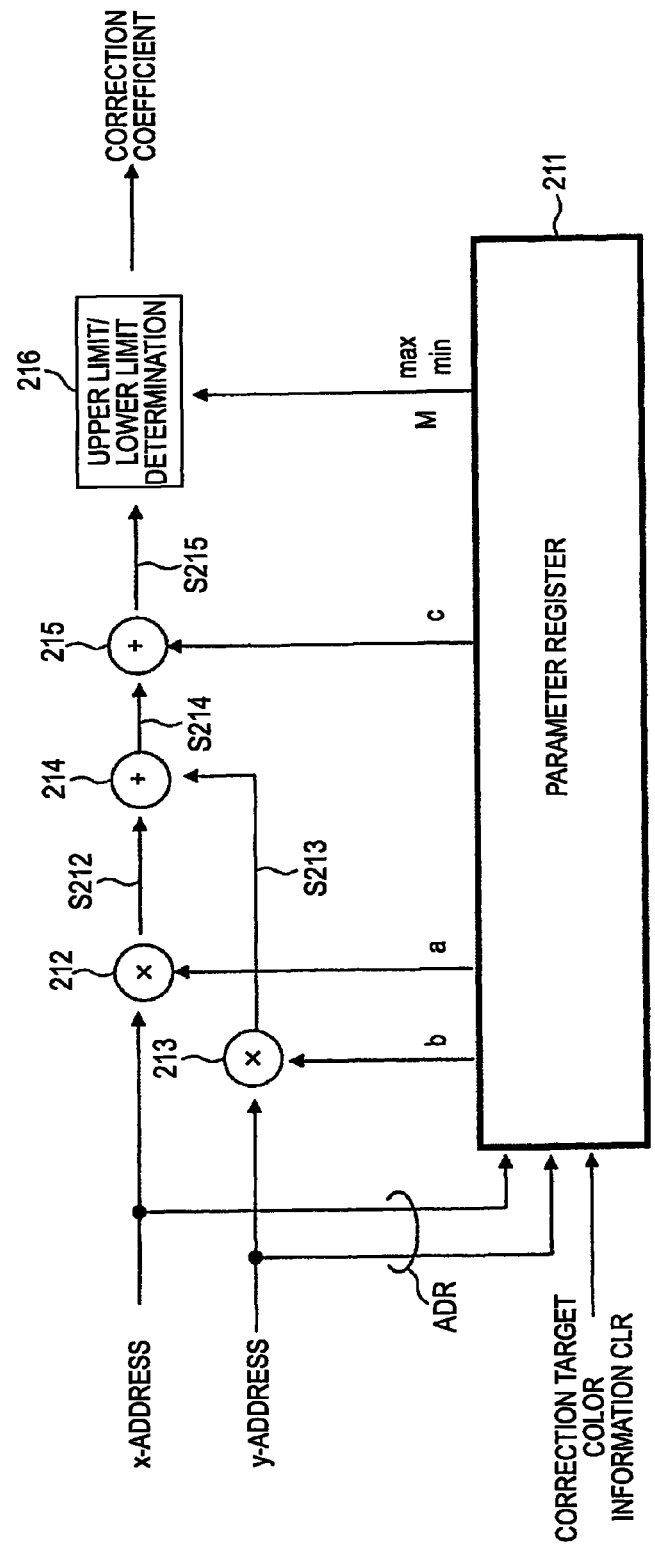
FIG. 13 is a diagram showing a configuration example of a correction coefficient calculation unit of color mixture correction according to the embodiment.

FIG. 13 is a diagram showing a configuration example of a correction coefficient calculation unit of color mixture correction according to the embodiment.

A correction coefficient calculation unit 210 includes a parameter register 211, multipliers 212, 213, adders 214, 215 and upper limit/lower limit determination unit 216.

The multiplier 212 multiplies an x-address by a gradient coefficient "a" by the parameter register 211, and output the result to the adder 214 as a signal S212.

The multiplier 213 multiplies a y-address by a gradient coefficient "b" by the parameter register 211 and outputs the result to the adder 214 as a signal S213.

The adder 214 adds the output signal S212 (a*x) of the multiplier 212 to the output signal S213 (b*y) of the multiplier 213 and outputs the result to the adder 215 as a signal S214.

The adder 214 adds the output signal (a*x+b*y) of the adder 214 to a constant "c" by the parameter register 211 and outputs the result to the upper limit/lower limit determination unit 216 as a signal S215.

The upper limit/lower limit determination unit 216 receives a clip value M by the parameter register 211 to clip the correction parameters exceeding the upper limit value or the lower limit value.

Figure 14:
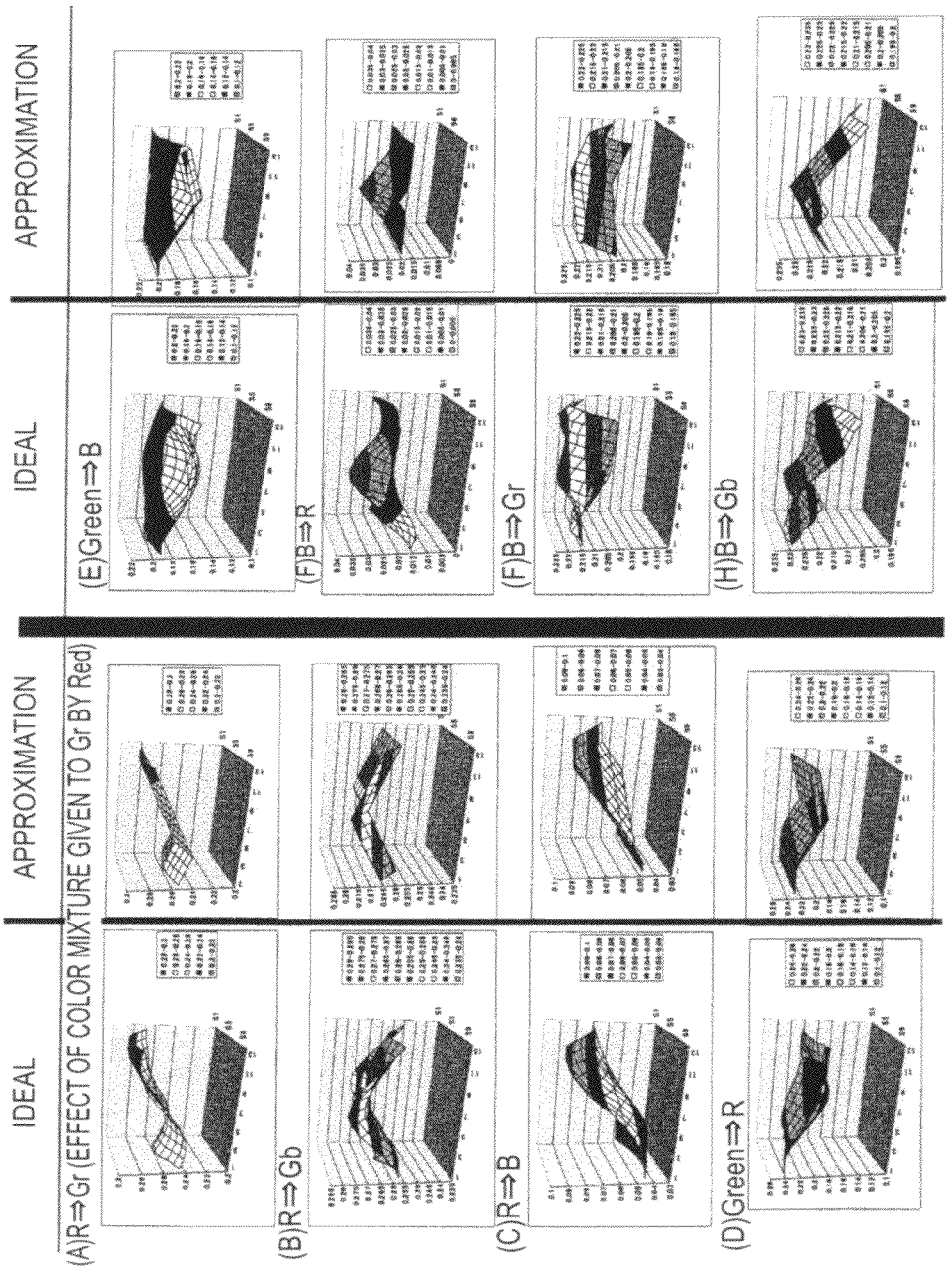
FIG. 14 illustrates views showing linear-function approximate parameters in the correction parameter table according to the embodiment by being associated with ideal cases as an example.

FIG. 14 illustrates views showing linear-function approximate parameters in the correction parameter table according to the embodiment by being associated with ideal cases as an example.

(A) in FIG. 14 shows comparison between ideal parameters and approximate parameters relating to effects given to a Gr-filter pixel by an R-filter pixel.

(B) in FIG. 14 shows comparison between ideal parameters and approximate parameters relating to effects given to a Gb-filter pixel by the R-filter pixel.

(C) in FIG. 14 shows comparison between ideal parameters and approximate parameters relating to effects given to a B-filter pixel by the R-filter pixel.

(D) in FIG. 14 shows comparison between ideal parameters and approximate parameters relating to effects given to the R-filter pixel by a G-filter pixel.

(E) in FIG. 14 shows comparison between ideal parameters and approximate parameters relating to effects given to the B-filter pixel by the G-filter pixel.

(F) in FIG. 14 shows comparison between ideal parameters and approximate parameters relating to effects given to the R-filter pixel by the B-filter pixel.

(G) in FIG. 14 shows comparison between ideal parameters and approximate parameters relating to effects given to a Gr-filter pixel by the B-filter pixel.

(H) in FIG. 14 shows comparison between ideal parameters and approximate parameters relating to effects given to the Gb-filter pixel by the B-filter pixel.

Here, the summary of operations of the solid-state imaging device 100 having the above configuration will be explained.

Analog signal values obtained by photoelectric conversion in the pixel unit 110 are converted into digital data in the column processing circuit group 150 and inputted to the color mixture correction circuit 200 through the horizontal transfer line LTRF and the amplifier circuit 170 by the horizontal transfer processing by the horizontal transfer scanning circuit 130.

The signal values inputted to the color mixture correction circuit 200 are stored in the memory (RAM) and matrix operation shown in Expression 2 is performed by using approximated correction parameters. The color mixture correction operation is performed before operation of automatic white balance processing in the image signal processing device 180.

The color mixture correction is performed by subtracting the value obtained by multiplying signal values of pixels adjacent to the correction target pixel in the vertical, horizontal and oblique directions by the correction parameters unique to the address from the signal value of the target pixel of color mixture correction SPXL in accordance with the operation expression shown in Expression 2.

According to the operation expression shown in Expression 2, effects of color mixture given by pixels not only in the horizontal direction but also the vertical direction and the oblique direction can be removed, therefore, the color mixture correction not depending ton color temperature can be realized.

Figure 15:
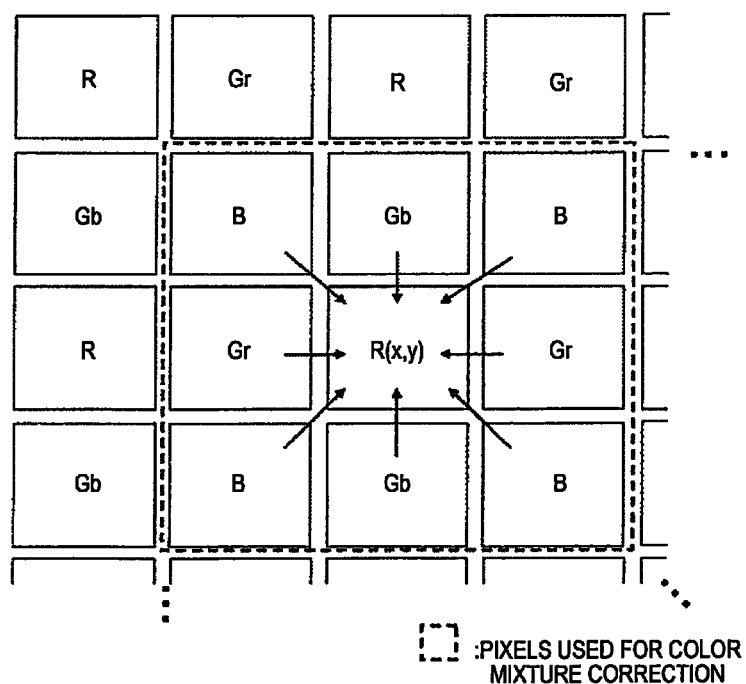
FIG. 15 is a view for explaining correction operation in an example of correcting color mixture from all neighboring pixels (8 pixels) adjacent to the target pixel of color mixture correction in Bayer arrangement when the color mixture amount has symmetric property.

Combinations of pixels used for color mixture correction may be combinations shown in FIG. 15, not limited to combinations of FIG. 4.

FIG. 15 is a view for explaining correction operation in an example of correcting color mixture from all neighboring pixels (8 pixels) adjacent to the target pixel of color mixture correction in Bayer arrangement when the color mixture amount has symmetric property.

In the configuration shown in FIG. 15, the color mixture from all neighboring pixels (8 pixels) adjacent to the target pixel of color mixture correction can be corrected. Accordingly, the correction amount can be changed according to positions with respect to the optical center.

Accordingly, the color mixture from all directions can be corrected.

When the color mixture amount has symmetric property in the case that the color mixture from all neighboring pixels (8 pixels) adjacent to the target pixel of color mixture correction is corrected in Bayer arrangement of FIG. 15, the correction operation expression will be as follows.

$$\begin{pmatrix} R'(x, y) \\ Gr'(x, y) \\ Gb'(x, y) \\ B'(x, y) \end{pmatrix} = \begin{pmatrix} a11(x, y) & a12(x, y) & a13(x, y) & a14(x, y) \\ a21(x, y) & a22(x, y) & a23(x, y) & a24(x, y) \\ a31(x, y) & a32(x, y) & a33(x, y) & a34(x, y) \\ a41(x, y) & a42(x, y) & a43(x, y) & a44(x, y) \end{pmatrix} \times$$ [Expression 5]

-continued $$\begin{pmatrix} Ave \cdot R(x, y) \\ Ave \cdot Gr(x, y) \\ Ave \cdot Gb(x, y) \\ Ave \cdot B(x, y) \end{pmatrix}$$

As plural neighboring pixels are used in this case, for example, average values of plural neighboring pixels PPXL adjacent to the target pixel of color mixture correction SPXL are applied as output signals SPPXL1, SPPXL2.

Figure 16:
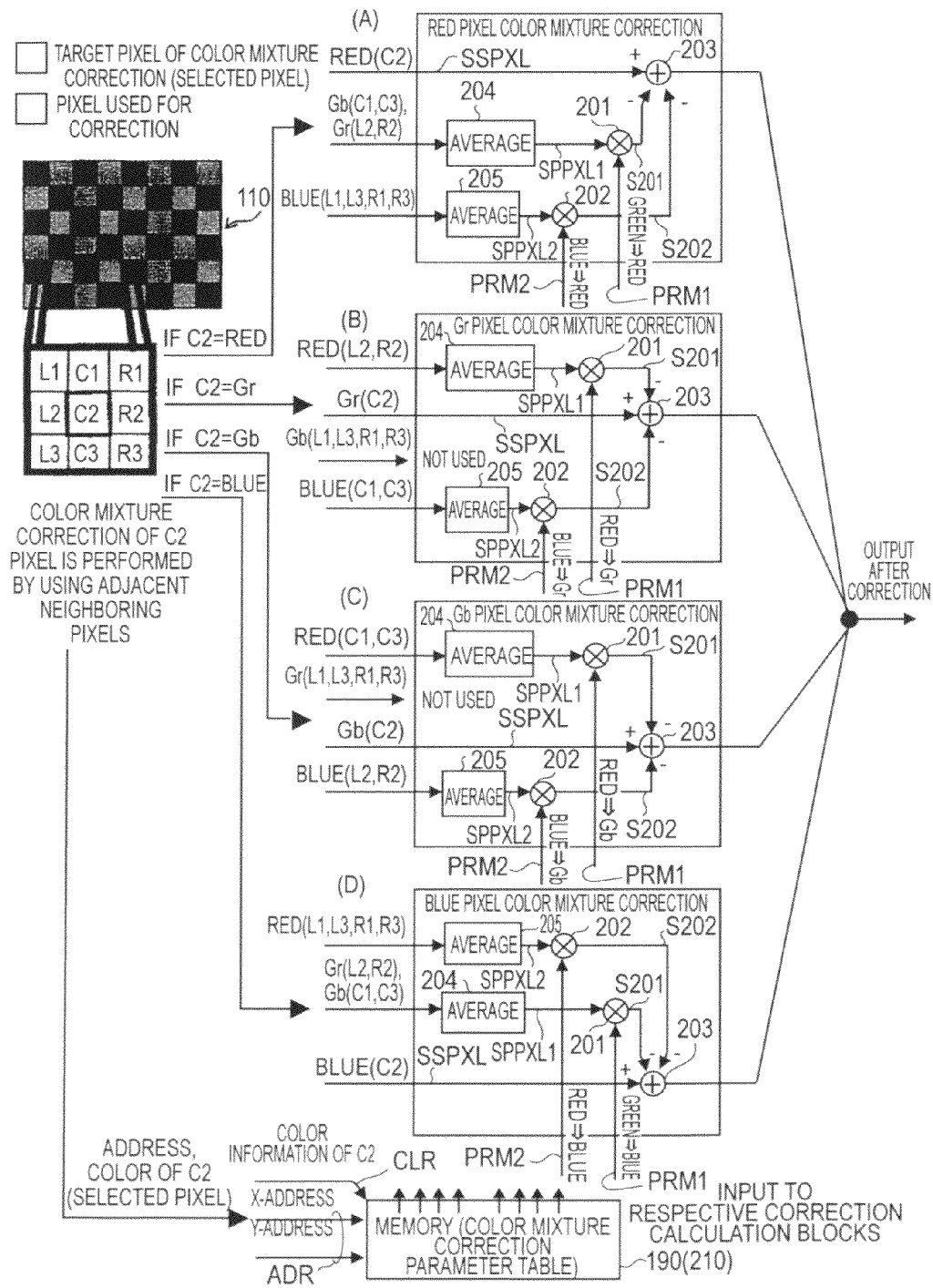
FIG. 16 is a diagram showing more specific functional configurations of the color mixture correction circuit when the color mixture from all neighboring pixels (8 pixels) adjacent to the target pixel of color mixture correction in Bayer arrangement as in FIG. 15.

FIG. 16 is a diagram showing more specific functional configurations of the color mixture correction circuit when the color mixture from all neighboring pixels (8 pixels) adjacent to the target pixel of color mixture correction in the Bayer arrangement as in FIG. 15.

In FIG. 16, eight pixels around the center pixel in a 3×3 matrix are used.

Pixels in the left column are L1, L2 and L3.
Pixels in the center column are C1, C2 and C3.
Pixels in the right column are R1, R2 and R3.

Then, the pixel C2 in the center is the target pixel of color mixture correction SSPXL.

When the target pixel of color mixture correction C2 (SPXL) is R, the following processing is performed.

In this case, a signal obtained by averaging values of Gr (L2, R2) and Gb (C1, C3) in the averaging circuit 204 is applied as the output signal SPPXL1 corresponding to one neighboring pixel PPXL1 adjacent to the target pixel of color mixture correction SPXL (R) as shown (A) in FIG. 16.

The signal SPPXL1 is multiplied by the correction parameter PRM1 in the multiplier 201 and the signal S201 is outputted to the adder/subtractor 203.

Also, a signal obtained by averaging values of B (L1, L3, R1 and R3) by an averaging circuit 205 is applied as the output signal SPPXL2 corresponding to the other neighboring pixel PPXL2 adjacent to the target pixel of color mixture correction SPXL (R).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (R) and the output correction signal is taken.

When the target pixel of color mixture correction C2 (SPXL) is Gr, the following processing is performed.

In this case, a signal obtained by averaging values of R (L2, R2) in the averaging circuit 204 is applied as the output signal SPPXL1 corresponding to one neighboring pixel PPXL1 adjacent to the target pixel of color mixture correction SPXL (Gr) as shown in (B) in FIG. 16.

The signal SPPXL1 is multiplied by the correction parameter PRM1 in the multiplier 201 and the signal S201 is outputted to the adder/subtractor 203.

Also, a signal obtained by averaging values of B (C1, C3) by the averaging circuit 205 is applied as the output signal SPPXL2 corresponding to the other neighboring pixel PPXL2 adjacent to the target pixel of color mixture correction SPXL (Gr).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (Gr) and the output correction signal is taken.

In this case, Gb (L1, L3, R1 and R3) pixels are not used.

When the target pixel of color mixture correction C2 (SPXL) is Gb, the following processing is performed.

In this case, a signal obtained by averaging values of R (C1, C3) in the averaging circuit 204 is applied as the output signal SPPXL1 corresponding to one neighboring pixel PPXL1 adjacent to the target pixel of color mixture correction SPXL (Gb) as shown in (C) in FIG. 16.

The signal SPPXL1 is multiplied by the correction parameter PRM1 in the multiplier 201 and the signal S201 is outputted to the adder/subtractor 203.

Also, a signal obtained by averaging values of B (L2, R2) by the averaging circuit 205 is applied as the output signal SPPXL2 corresponding to the other neighboring pixel PPXL2 adjacent to the target pixel of color mixture correction SPXL (Gb).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (Gb) and the output correction signal is taken.

In this case, Gr (L1, L3, R1 and R3) pixels are not used.

When the target pixel of color mixture correction C2 (SPXL) is B, the following processing is performed.

In this case, a signal obtained by averaging values of Gr (L2, R2) and Gb (C1, C3) in the averaging circuit 204 is applied as the output signal SPPXL1 corresponding to one neighboring pixel PPXL1 adjacent to the target pixel of color mixture correction SPXL (B) as shown in (D) in FIG. 16.

The signal SPPXL1 is multiplied by the correction parameter PRM1 in the multiplier 201 and the signal S201 is outputted to the adder/subtractor 203.

Also, a signal obtained by averaging values of R (L1, L3, R1 and R3) by an averaging circuit 205 is applied as the output signal SPPXL2 corresponding to the other neighboring pixel PPXL2 adjacent to the target pixel of color mixture correction SPXL (B).

The signal SPPXL2 is multiplied by the correction parameter PRM2 in the multiplier 202 and the signal S202 is outputted to the adder/subtractor 203.

Then, the output signals S201, S202 of the multipliers 201, 202 are added to the signal SSPXL of the target pixel of color mixture correction SPXL in the adder/subtractor 203 to obtain the correction signal, and difference between the signal value SSPXL of the target pixel of color mixture correction SPXL (B) and the output correction signal is taken.

Figure 17:
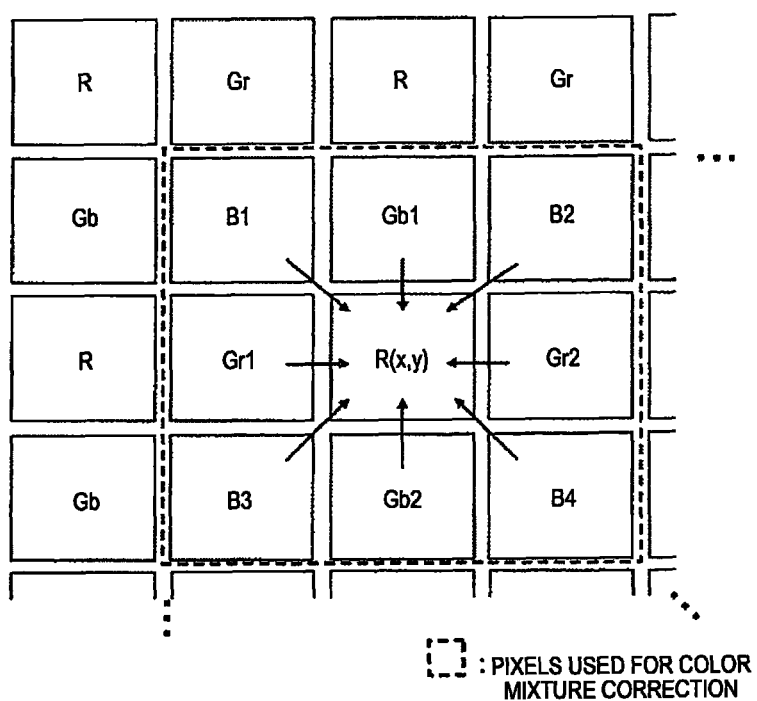
FIG. 17 is a view for explaining correction operation in an example of correcting color mixture from all neighboring pixels (8 pixels) adjacent to the target pixel of color mixture correction in the Bayer arrangement when the color mixture amount does not have symmetric property.

FIG. 17 is a view for explaining correction operation in an example of correcting color mixture from all neighboring pixels (8 pixels) adjacent to the target pixel color mixture correction in the Bayer arrangement when the color mixture amount does not have symmetric property.

In the example of FIG. 15, the correction operation expression used when color mixture from all neighboring pixels (8 pixels) adjacent to the target pixel of color mixture correction is corrected in the Bayer arrangement and when the color mixture amount has symmetric property is shown in Expression 5.

On the other hand, a correction operation expression used when the color mixture amount does not have symmetric property is as follows. In this case, correction coefficients according to combinations of pixels are included.

The color mixture amount to $R(x, y)$ = [Expression 6]

$$\begin{pmatrix} gr1(x, y) & gr2(x, y) & gb1(x, y) & gb2(x, y) \\ b1(x, y) & b2(x, y) & b3(x, y) & b4(x, y) \end{pmatrix} \times \begin{pmatrix} Gr1(x, y) \\ Gr2(x, y) \\ Gb1(x, y) \\ Gb2(x, y) \\ B1(x, y) \\ B2(x, y) \\ B3(x, y) \\ B4(x, y) \end{pmatrix}$$

In the above embodiment, the Bayer arrangement has been explained as an example of the pixel arrangement.

As the pixel arrangement in the embodiment of the invention, not only the Bayer arrangement but also an interline arrangement, a checkered arrangement, a honeycomb arrangement and so on can be applied, further, as the filter arrangement, not only the primary-color filter arrangement but also complementary-color filter arrangement can be applied.

As complementary colors, cyan (Cy), magenta (Mg) and yellow (Y) are included.

As the pixel arrangement, a white-pixel type using a white pixel (W), a honeycomb type and a clear bit type can be applied.

Figure 18:
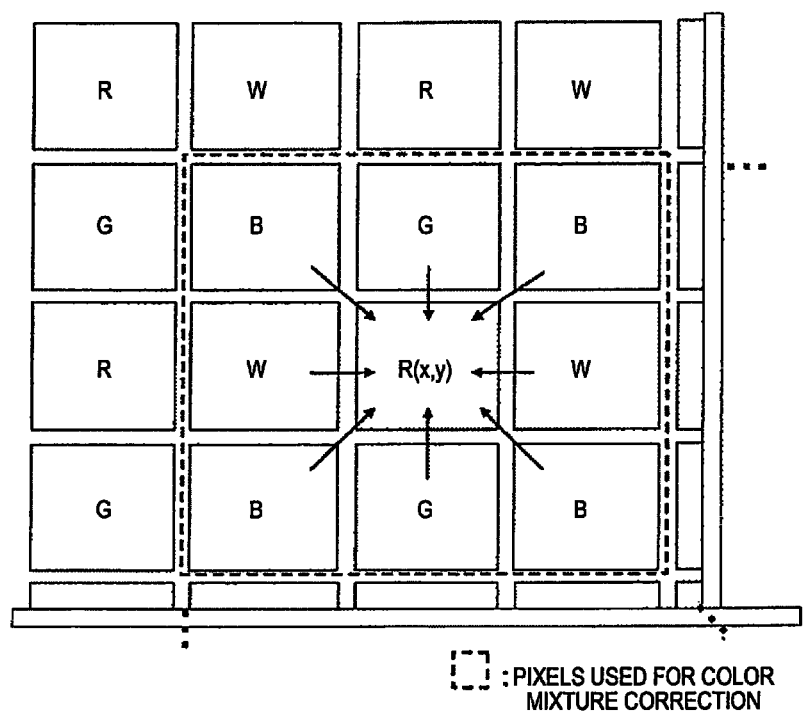
FIG. 18 is a view for explaining correction operation in an example of correcting color mixture from all neighboring pixels (8 pixels) adjacent to the target pixel of color mixture correction in a white-pixel arrangement when the color mixture amount has symmetric property.
Figure 19:
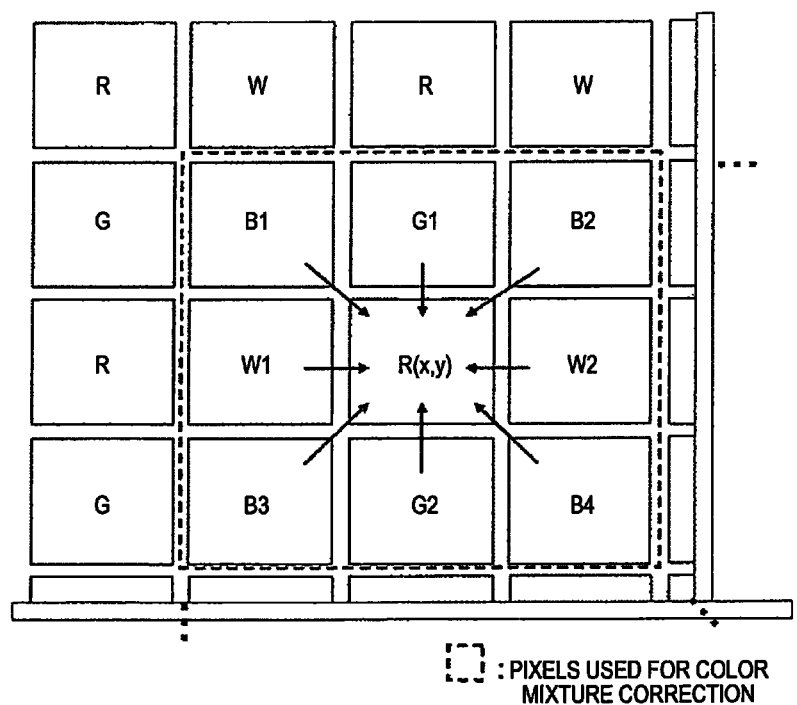
FIG. 19 is a view for explaining correction operation in an example of correcting color mixture from all neighboring pixels (8 pieces) adjacent to the target pixel of color mixture correction in the white-pixel arrangement when the color mixture amount does not have symmetric property.
Figure 20:
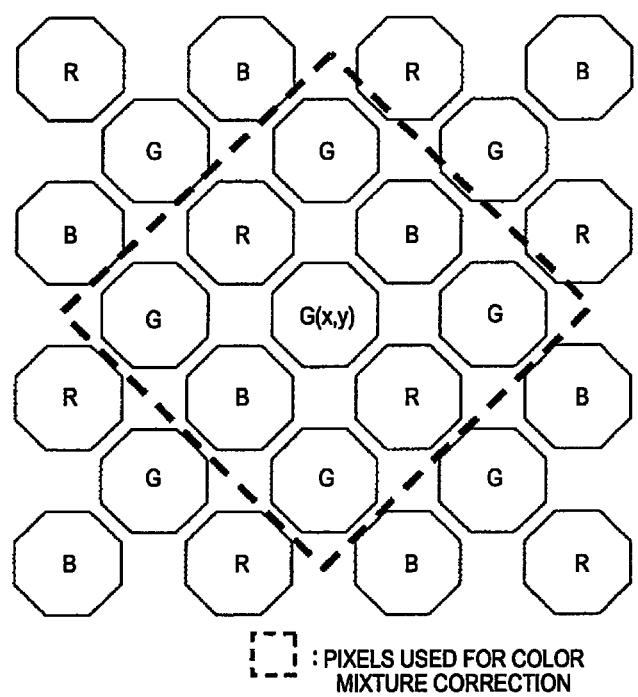
FIG. 20 is a view for explaining correction operation in an example of correcting color mixture from all neighboring pixels (8 pixels) adjacent to the target pixel of color mixture correction in a honeycomb pixel arrangement when the color mixture amount has symmetric property.
Figure 21:
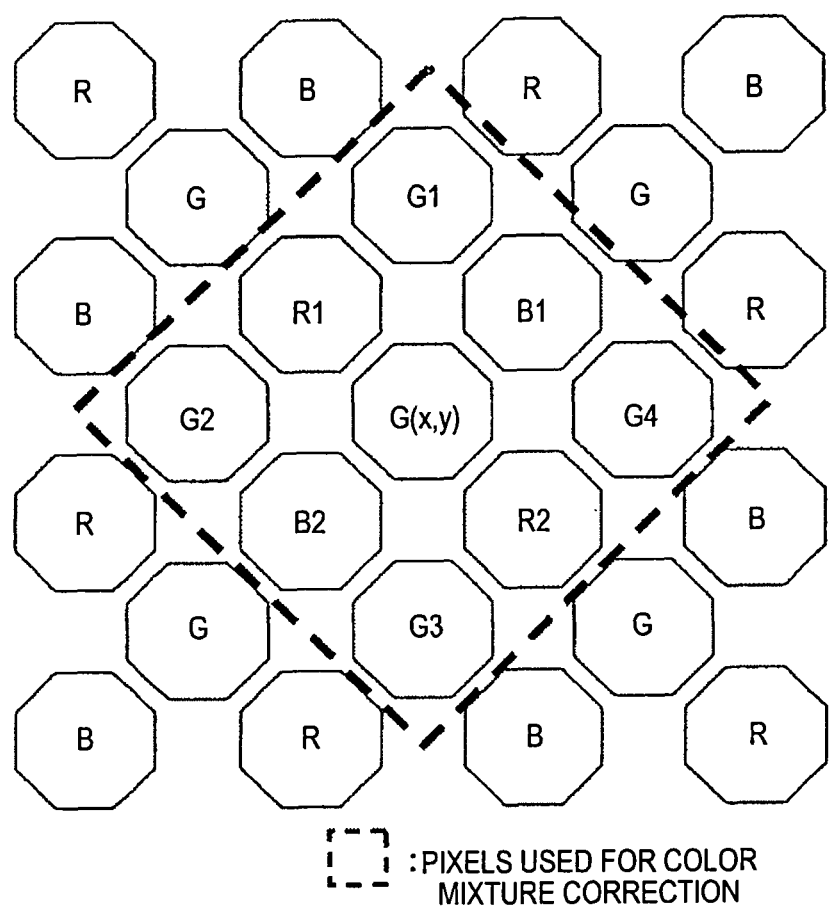
FIG. 21 is a view for explaining correction operation in an example of correcting color mixture from all neighboring pixels (8 pixels) adjacent to the target pixel of color mixture correction in the honeycomb pixel arrangement when the color mixture amount does not have symmetric property.
Figure 22:
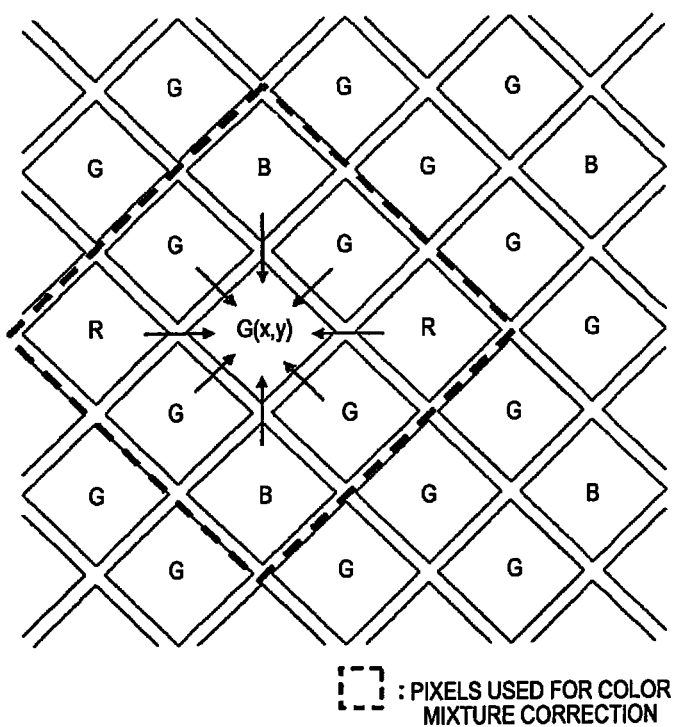
FIG. 22 is a view for explaining correction operation in an example of correcting color mixture from all neighboring pixels (8 pixels) adjacent to the target pixel of color mixture correction in a clear-bit type pixel arrangement when the color mixture amount has symmetric property.
Figure 23:
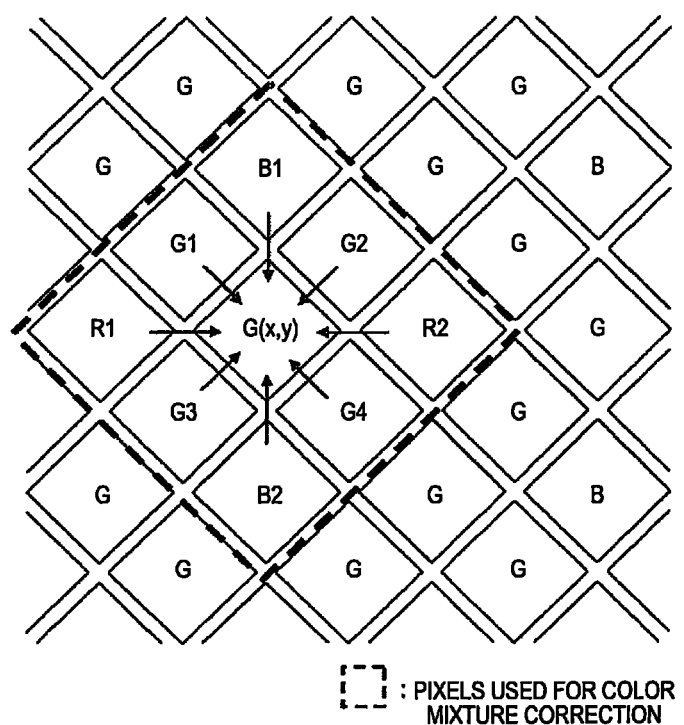
FIG. 23 is a view for explaining correction operation in an example of correcting color mixture from all neighboring pixels (8 pixels) adjacent to the target pixel of color mixture correction in the clear-bit type pixel arrangement when the color mixture amount does not have symmetric property.

As examples of pixel combinations used for correction, examples of the white-pixel type are shown in FIG. 18 and FIG. 19, examples of the honeycomb type are shown in FIG. 20 and FIG. 21 and examples of the clear-bit type are shown in FIG. 22 and FIG. 23.

In the white-pixel type, the G-pixel is arranged at the arrangement position of the Gr-pixel in the unit UNT of the Bayer arrangement and a white (W)-pixel is arranged at the arrangement position of Gb-pixel.

FIG. 18 is a view for explaining correction operation in an example of correcting color mixture from all neighboring pixels (8 pixels) adjacent to the target pixel of color mixture correction in the white-pixel arrangement when the color mixture amount has symmetric property.

In the configuration shown in FIG. 18, color mixture from all neighboring pixels (8 pixels) adjacent to the target pixel of color mixture correction can be corrected. Therefore, the correction amount can be changed according to positions with respect to the optical center.

Accordingly, color mixture from all directions can be corrected.

In the white-pixel arrangement of FIG. 18, a correction operation expression used when color mixture from all neighboring pixels (8 pixels) adjacent to the target pixel of color mixture correction is corrected and when the color mixture amount has symmetric property is as follows.

$$\begin{pmatrix} R'(x,y) \\ G'(x,y) \\ B'(x,y) \\ W'(x,y) \end{pmatrix} = \quad \text{[Expression 7]}$$

$$\begin{pmatrix} a11(x,y) & a12(x,y) & a13(x,y) & a14(x,y) \\ a21(x,y) & a22(x,y) & a23(x,y) & a24(x,y) \\ a31(x,y) & a32(x,y) & a33(x,y) & a34(x,y) \\ a41(x,y) & a42(x,y) & a43(x,y) & a44(x,y) \end{pmatrix} \times$$

$$\begin{pmatrix} Ave \cdot R(x,y) \\ Ave \cdot G(x,y) \\ Ave \cdot B(x,y) \\ Ave \cdot W(x,y) \end{pmatrix}$$

FIG. 19 is a view for explaining correction operation in an example of correcting color mixture from all neighboring pixels (8 pixels) adjacent to the target pixel of color mixture correction in the white-pixel arrangement when the color mixture amount does not have symmetric property.

In the example of FIG. 18, the correction operation expression used when color mixture from all neighboring pixels (8 pixels) adjacent to the target pixel of color mixture correction is corrected in the white-pixel arrangement and when the color mixture amount has symmetric property is shown in Expression 7.

On the other hand, a correction operation expression used when the color mixture amount does not have symmetric property is as follows. In this case, correction coefficients according to combinations of pixels are included.

$$\text{The color mixture amount to } R(x,y) = \quad \text{[Expression 8]}$$

$$\begin{pmatrix} b1(x,y) & b2(x,y) & b3(x,y) & b4(x,y) \\ g1(x,y) & g2(x,y) & w1(x,y) & w2(x,y) \end{pmatrix} \times \begin{pmatrix} B1(x,y) \\ B2(x,y) \\ B3(x,y) \\ B4(x,y) \\ G1(x,y) \\ G2(x,y) \\ W1(x,y) \\ W2(x,y) \end{pmatrix}$$

In the honeycomb type, the R-pixels are arranged at oblique upper left and oblique lower right of the G-pixel with the center at the G-pixel, and B-pixels are arranged at oblique upper right and oblique lower left of the G-pixel.

FIG. 20 is a view for explaining correction operation in an example of correcting color mixture from all neighboring pixels (8 pixels) adjacent to the target pixel of color mixture correction in the honeycomb pixel arrangement when the color mixture amount has symmetric property.

In the configuration shown in FIG. 20, color mixture from all neighboring pixels (8 pixels) adjacent to the target pixel of color mixture correction. Therefore, the correction amount can be changed according to positions with respect to the optical center.

Accordingly, color mixture from all directions can be corrected.

In the honeycomb pixel arrangement of FIG. 20, a correction operation expression used when color mixture from all neighboring pixels (8 pixels) adjacent to the target pixel of color mixture correction is corrected and when the color mixture amount has symmetric property is as follows. Gr and Gb in this case are the same as in the case of the Bayer arrangement.

$$\begin{pmatrix} R'(x,y) \\ Gr'(x,y) \\ Gb'(x,y) \\ B'(x,y) \end{pmatrix} = \quad \text{[Expression 9]}$$

$$\begin{pmatrix} a11(x,y) & a12(x,y) & a13(x,y) & a14(x,y) \\ a21(x,y) & a22(x,y) & a23(x,y) & a24(x,y) \\ a31(x,y) & a32(x,y) & a33(x,y) & a34(x,y) \\ a41(x,y) & a42(x,y) & a43(x,y) & a44(x,y) \end{pmatrix} \times$$

$$\begin{pmatrix} Ave \cdot R(x,y) \\ Ave \cdot Gr(x,y) \\ Ave \cdot Gb(x,y) \\ Ave \cdot B(x,y) \end{pmatrix}$$

FIG. 21 is a view for explaining correction operation in an example of correcting color mixture from all neighboring pixels (8 pixels) adjacent to the target pixel of color mixture correction in the honeycomb pixel arrangement when the color mixture amount does not have symmetric property.

In the example of FIG. 20, the correction operation expression used when color mixture from all neighboring pixels (8 pixels) adjacent to the target pixel of color mixture correction is corrected in the honeycomb pixel arrangement and when the color mixture amount has symmetric property is shown in Expression 9.

On the other hand, a correction operation expression used when the color mixture amount does not have symmetric property is as follows. In this case, correction coefficients according to combinations of pixels are included.

$$\text{The color mixture amount to } G(x,y) = \quad \text{[Expression 10]}$$

$$\begin{pmatrix} g1(x,y) & g2(x,y) & g3(x,y) & g4(x,y) \\ r1(x,y) & r2(x,y) & b1(x,y) & b2(x,y) \end{pmatrix} \times \begin{pmatrix} G1(x,y) \\ G2(x,y) \\ G3(x,y) \\ G4(x,y) \\ R1(x,y) \\ R2(x,y) \\ B1(x,y) \\ B2(x,y) \end{pmatrix}$$

In the clear bit type, the G-pixel is arranged at oblique upper left of the G-pixel with the center at the G-pixel, and G-pixel is arranged at oblique upper right and the oblique loser left of the G-pixel. The R-pixel is arranged at left side and the right side of the G-pixel as well as the B-pixel is arranged at upper side and lower side of the G-pixel.

FIG. 22 is a view for explaining correction operation in an example of correcting color mixture from all neighboring pixels (8 pixels) adjacent to the target pixel of color mixture correction in the clear-bit type pixel arrangement when the color mixture amount has symmetric property.

In the configuration shown in FIG. 22, color mixture from all neighboring pixels (8 pixels) adjacent to the target pixel of color mixture correction. Therefore, the correction amount can be changed according to positions with respect to the optical center.

Accordingly, color mixture from all directions can be corrected.

In the clear-bit type pixel arrangement of FIG. 22, a correction operation expression used when color mixture from all neighboring pixels (8 pixels) adjacent to the target pixel of color mixture correction is corrected and when the color mixture amount has symmetric property is as follows.

Concerning names of the G-pixel in this case, the G-pixel in which two edges are surrounded by G-pixels is referred to as Grb, and the G-pixel in which four edges are surrounded by G-pixels is referred to as Gc. Grb may also be dealt as a different color when difference in the color mixture occurs.

$$\begin{pmatrix} R'(x, y) \\ Grb'(x, y) \\ Gc'(x, y) \\ B'(x, y) \end{pmatrix} = \quad \text{[Expression 11]}$$

$$\begin{pmatrix} a11(x, y) & a12(x, y) & a13(x, y) & a14(x, y) \\ a21(x, y) & a22(x, y) & a23(x, y) & a24(x, y) \\ a31(x, y) & a32(x, y) & a33(x, y) & a34(x, y) \\ a41(x, y) & a42(x, y) & a43(x, y) & a44(x, y) \end{pmatrix} \times \begin{pmatrix} Ave \cdot R(x, y) \\ Ave \cdot Grb(x, y) \\ Ave \cdot Gc(x, y) \\ Ave \cdot B(x, y) \end{pmatrix}$$

FIG. 23 is a view for explaining correction operation in an example of correcting color mixture from all neighboring pixels (8 pixels) adjacent to the target pixel of color mixture correction in the clear-bit type pixel arrangement when the color mixture amount does not have symmetric property.

In the example of FIG. 22, the correction operation expression used when color mixture from all neighboring pixels (8 pixels) adjacent to the target pixel of color mixture correction is corrected in the honeycomb pixel arrangement and when the color mixture amount does not have symmetric property is shown in Expression 11.

On the other hand, a correction operation expression used when the color mixture amount does not have symmetric property is as follows. In this case, correction coefficients according to combinations of pixels are included.

$$\text{The color mixture amount to } G(x, y) = \quad \text{[Expression 12]}$$

$$\begin{pmatrix} g1(x, y) & g2(x, y) & g3(x, y) & g4(x, y) \\ r1(x, y) & r2(x, y) & b1(x, y) & b2(x, y) \end{pmatrix} \times \begin{pmatrix} G1(x, y) \\ G2(x, y) \\ G3(x, y) \\ G4(x, y) \\ R1(x, y) \\ R2(x, y) \\ B1(x, y) \\ B2(x, y) \end{pmatrix}$$

The pixel arrangement examples which can be applied by the invention have been explained as the above.

The invention can be applied also when performing so-called pixel sharing.

FIGS. 24A to 24C are views showing examples of color filters, a pixel layout and a pixel circuit when the pixel sharing configuration is applied in each unit of the Bayer arrangement in the pixel unit according to the embodiment.

In the pixel configuration, the reset transistor 113, the amplification transistor 114, the selection transistor 115 and the floating diffusion FD are shared among three pixels.

In the pixel sharing system shown in FIG. 24A, a photoelectric conversion element (PD)a is applied as a photodiode of R, PDb and PDc are applied as photodiodes of Gr, Gb and PDd is applied as a photodiode of B in the Bayer arrangement.

Then, respective photodiodes PDa to PDd are connected to FD through the transfer transistor 112.

The pixel configurations of FIGS. 24B, 24C show the zig-zag type four-pixel sharing system. In this case, the floating diffusion FD is shared among a filter pixel R1 in the n-th row, a filter pixel B1 in the n+1th row, a filter pixel R2 in the n+2th row and a filter pixel B2 in the n+3th row in the Bayer arrangement. The reset transistor 113, the amplification transistor 114 and the selection transistor 115 are shared among three pixels.

Respective photodiodes PDa to PDd are connected to the FD through the transfer transistor 112.

As described above, the invention can be applied to the case of performing the pixel sharing.

The layout under the color filters differs even in the color filters having the same color, therefore, color mixture correction operations in respective color filters are not sufficient and color mixture correction operations considering difference in the base layout is necessary in addition to the difference in the color filter.

Moreover, correction parameters used for color mixture correction may be not only correction parameters unique to the address but also correction parameters unique to an area obtained by being divided into blocks.

In the future, in applications to small cameras such as a cellular phone, the height of a module in the light axis direction is desired to be low.

As a result, a light incident angle is inclined by a larger image height with respect to the central part of the sensor, therefore, the color mixture amount differs in the central part of the screen and in the peripheral part thereof.

To change the color mixture correction amount according to the image height will be important as miniaturization proceeds in the future.

In recent years, it is requested that good images are taken with low resolution even in image sensors having high resolution.

For example, a function of recording moving pictures by a digital still camera and a function of recording still pictures by a camcorder become popular.

These electronic apparatus have a viewfinder for checking video in many cases. The resolution of the viewfinder is normally lower than images to be taken.

Additionally, part of digital still cameras or cellular phones has a function of imaging high-speed movement which has not seen in the past by improving the frame rate at the time of imaging with low resolution.

As described above, it is requested that one image sensor responds to both still pictures with high resolution and in the low frame rate as well as moving pictures with relatively low resolution and in the high frame rate.

Concerning the above, the CMOS image sensor responding to an all-pixel mode in which signals are read from all pixels and a thinning-out mode in which signals are read intermittently while skipping rows and columns is proposed.

In the CMOS image sensor, the all-pixel mode is used when imaging still pictures with high resolution and the thinning-out mode is used when imaging moving pictures with low resolution or in the high frame rate.

When performing color mixture correction according to the embodiment in the thinning-out mode, use of thinned-out pixels at the time of performing simple thinning-out in the thinning-out mode causes an error.

It is necessary to allow the sensor to perform operation of not using the thinned-out pixels when performing color mixture correction.

FIG. 25 is a view showing results of comparing color mixture correction processing when using signal values of thinned-out pixels and when not using the signal values when performing ½ thinning-out processing.

When signal values of the thinned-out pixels are used, false color occurs at edges.

On the other hand, when signal values of the thinned-out pixels are not used, false color does not occur at edges.

Therefore, it is necessary to allow the sensor to perform operation of not using the thinned-out pixels when performing color mixture correction.

Figure 26:
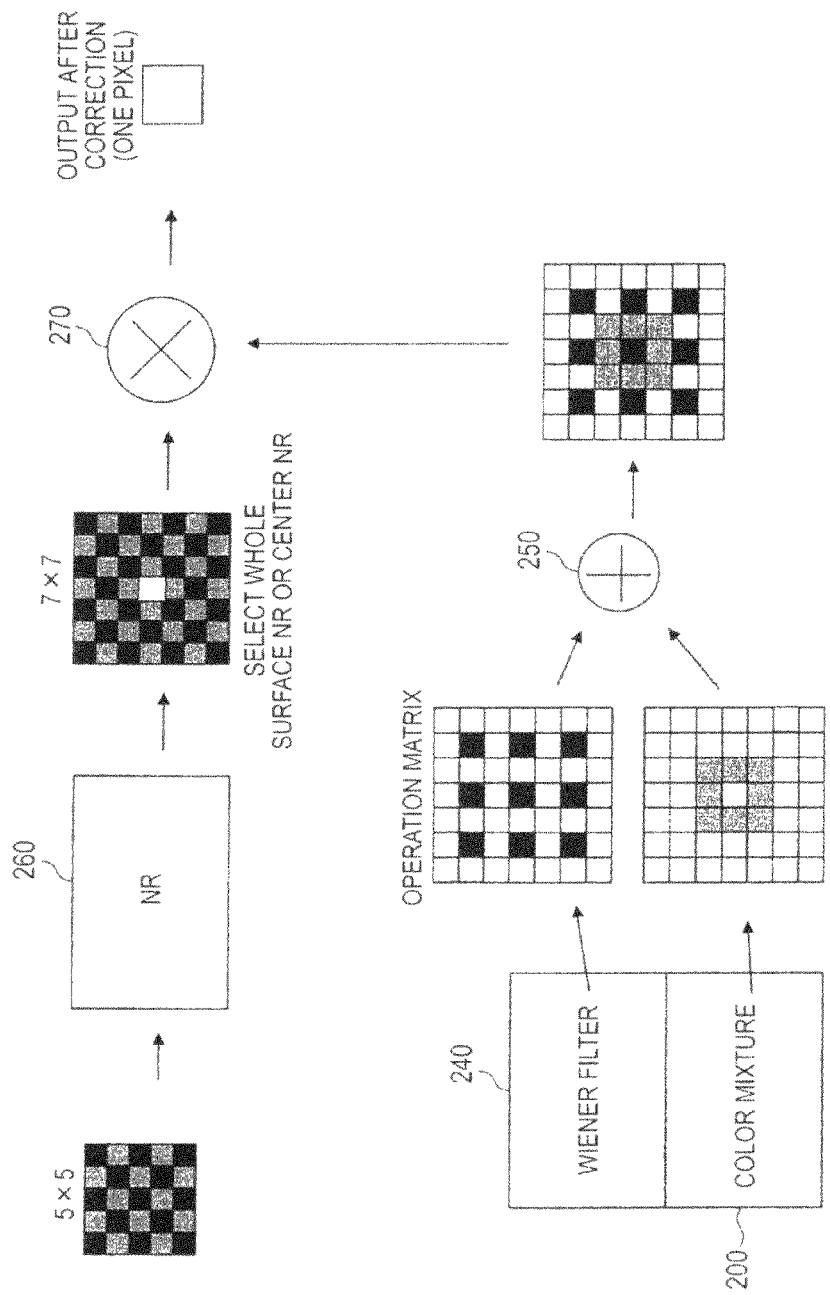
FIG. 26 is a view showing an example of processing of simultaneously performing Wiener filter operation and color mixture correction operation in parallel.

FIG. 26 is a view showing an example of processing of simultaneously performing Wiener filter operation and color mixture correction operation in parallel.

In the image signal processing device 180, operation processing using a filter is performed in addition to the color mixture correction processing.

For example, matrix operation processing using a Wiener Filter operation circuit 240 is performed in the image signal processing device 180.

In the embodiment, an operation coefficient matrix of the Wiener Filter operation circuit 240 is added to and an operation coefficient matrix of the color mixture correction circuit 200 in an adder 250 as shown in, for example in FIG. 26.

Then, an original image, for example, a 5×5 original image in the example of FIG. 26 is corrected to an 7×7 image by being processed at a noise reduction processing (NR processing) circuit 260, and the result is multiplied by the added result of the adder 250 in a multiplier 270 to obtain an output after correction.

As described above, the following effects can be obtained according to the embodiment.

That is, according to the embodiment, the color mixture correction different according to addresses can be realized by including correction parameters different according to addresses.

The color mixture of Gr and Gb is corrected by using different correction parameters respectively, thereby correcting effects of color mixture different according to arrangement of color filters of adjacent neighboring pixels.

It is also possible to correct effects of color mixture occurring when the layout shape at the lower layer is different among pixels of the color filters.

For example, the color mixture is corrected from vertical, horizontal and oblique directions by basically using the expression shown in Expression 2 to thereby realize highly precise color mixture correction as well as realize color mixture correction not depending on color temperature.

Accordingly, a system for calculating color temperature is not necessary and a memory for storing correction parameters different according to color temperature is not also necessary, therefore, the circuit scale can be reduced.

Additionally, the correction parameters to be used are approximated to thereby further reduce the circuit scale.

As the color mixture is corrected in respective addresses of pixels in the embodiment, highly precise correction can be made even when the color mixture amount has asymmetric property.

Accordingly, variations on manufacture such as displacement of a mask occurring with miniaturization of semiconductor processes, displacement in fitting of a lens in manufacturing processes of a module and so on can be corrected by individually performing adjustment by applying the invention.

The CMOS image sensor to which the embodiment of the invention is applied is not limited to a front-illuminated type or a back-illuminated type, and are effective in both sensors.

The solid-state imaging device having the above advantages can be applied as the imaging device for a digital camera or a video camera.

<4. Configuration Example of a Camera System>

Figure 27:
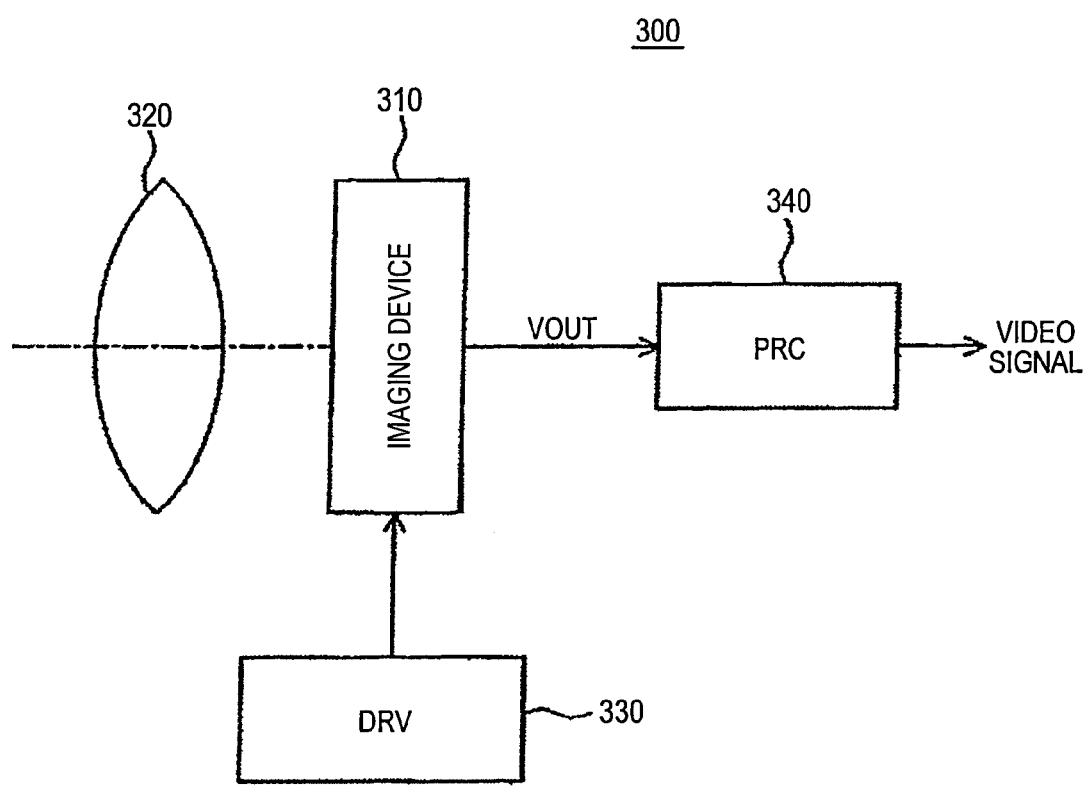
FIG. 27 is a view showing a configuration example of a camera system to which the solid-state imaging device according to the embodiment of the invention is applied.

FIG. 27 is a view showing a configuration example of a camera system to which the solid-state imaging device according to the embodiment of the invention is applied.

A camera system 300 includes an imaging device 310 to which the solid-state imaging device 100 according to the embodiment can be applied as shown in FIG. 27.

The camera system 300 includes, for example, a lens 320 imaging incident light (image light) on an imaging surface as an optical system introducing incident light (imaging a subject image) to the pixel region of the imaging device 310.

The camera system 300 further includes a drive circuit (DRV) 330 driving the imaging device 310 and a signal processing circuit (PRC) 340 processing output signals of the imaging device 310.

The drive circuit 330 includes a timing generator (not shown) generating various kinds of timing signals including a start pulse and a clock pulse driving circuits in the imaging device 310, driving the imaging device 310 with a given timing signal.

The signal processing circuit 340 performs given signal processing to output signals of the imaging device 310.

Image signals processed in the signal processing circuit 340 are recorded in a recording medium such as a memory. Image information recorded in the recording medium is hard copied by a printer and so on. The image signals processed in the signal processing circuit 340 are reproduced as moving pictures on a monitor including a liquid crystal display and the like.

As described above, the above solid-state imaging device 100 is mounted as the imaging device 310 on the imaging apparatus such as a digital still camera, thereby realizing high precision camera.

The method described in detail as the above can be also formed as a program corresponding to the above procedures and configured so as to be executed by a computer such as a CPU.

Such program can be configured to be executed by being accessed to recording media such as a semiconductor memory, a magnetic disk, an optical disc, and a Floppy (trademark) disk by a computer to which the recording medium is set.

The present application contains subject matter related to that disclosed in Japanese Priority Patent Application JP 2010-026202 filed in the Japan Patent Office on Feb. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing device comprising:
a color mixture correction circuit configured to correct color mixture among pixels arranged in the row and column directions, the pixels having plural light receiving units which perform photoelectric conversion and including filters dividing light incident on respective plural light receiving units into plural color components,
wherein the color mixture correction circuit is configured to perform correction processing to a signal value of a target pixel of color mixture correction by associating respective signal values of neighboring pixels adjacent to the target pixel of color mixture correction with correction parameters unique to an address of each signal, the correction parameter being a function of a column coordinate and/or a row coordinate of the target pixel of color mixture correction.

2. The image signal processing device according to claim 1,
wherein the color mixture correction circuit is configured to perform a color mixture correction operation to pixels formed by color filters of the same color by using correction parameters different according to an arrangement of color filters on adjacent neighboring pixels.

3. The image signal processing device according to claim 1,
wherein the color mixture correction circuit is configured to perform a color mixture correction operation of pixels formed by color filters of the same color by using correction parameters different according to a layout shape of a layer under the color filters.

4. The image signal processing device according to claim 1,
wherein the color mixture correction circuit is configured to apply a correction parameter approximated to a polynomial with an address of the target pixel of color mixture correction as variables as the correction parameter.

5. The image signal processing device according to claim 4,
wherein the color mixture correction circuit is configured to clip correction parameters at an upper limit value or a lower limit value in the polynomial with the address as variables.

6. The image signal processing device according to claim 5,
wherein the color mixture correction circuit is configured to divide the parameter into $(i+1)^2$ areas with i-inflection points and apply polynomials having the address as variables in respective areas.

7. The image signal processing device according to claim 1,
wherein the color mixture correction circuit includes
a multiplier unit configured to multiply respective output signals corresponding to neighboring pixels adjacent to the target pixel of color mixture correction by the correction parameter unique to the address,
an adder unit configured to add the output signal of the multiplier unit to a signal of the target pixel of color mixture correction to obtain a correction signal and
a subtractor unit configured to take a difference between the signal value of the target pixel of color mixture correction pixel and an output signal of the adder unit.

8. The image signal processing device according to claim 1,
wherein the color mixture correction circuit is configured to average signal values of plural pixels neighboring the target pixel of color mixture correction to set an averaged signal as the signal corresponding to neighboring pixels of the target pixel of color mixture correction and multiplying the signal by the correction parameter unique to the address.

9. The image signal processing device according to claim 1,
wherein the color mixture correction circuit is configured to apply pixels adjacent to the target pixel of color mixture correction in the horizontal direction as well as the vertical direction or in the horizontal direction as well as an oblique direction or in the horizontal direction, in the vertical direction as well as the oblique direction with respect as neighboring pixels adjacent to the target pixel of color mixture correction.

10. The image signal processing device according to claim 1, wherein the correction parameter is a function of a column coordinate and a row coordinate of the target pixel of color mixture correction.

11. An imaging device comprising:
an image unit having plural light receiving units arranged in row and column directions so as to form an imaging surface, the light receiving units configured to perform photoelectric conversion and including filters dividing light incident on respective plural light receiving units into plural color components; and
an image signal processing device configured to perform image processing to image signals obtained in the image unit,
wherein the image signal processing device includes
a color mixture correction circuit configured to correct color mixture between pixels, and
the color mixture correction circuit is configured to perform correction processing to a signal value of a target pixel of color mixture correction by associating respective signal values of neighboring pixels adjacent to the target pixel of color mixture correction with correction parameters unique to an address of each signal, the correction parameter being a function of a column coordinate and/or a row coordinate of the target pixel of color mixture correction.

12. The imaging device according to claim 11,
wherein the color mixture correction circuit is configured to perform a color mixture correction operation to pixels formed by color filters of the same color by using correction parameters different according to arrangement of color filters of adjacent neighboring pixels.

13. The imaging device according to claim 11,
wherein the color mixture correction circuit is configured to perform a color mixture correction operation of pixels formed by color filters of the same color by using correction parameters different according to a layout shape of a layer under the color filters.

14. The imaging device according to claim 11,
wherein the color mixture correction circuit is configured to apply a correction parameter approximated to a polynomial with an address of the target pixel of color mixture correction as variables as the correction parameter.

15. The imaging device according to claim 14,
wherein the color mixture correction circuit is configured to clip correction parameters at an upper limit value or a lower limit value in the polynomial with the address as variables.

16. The imaging device according to claim 15,
wherein the color mixture correction circuit is configured to divide the parameter into $(i+1)^2$ areas with i-inflection points and apply polynomials having the address as variables with respect to respective areas.

17. The imaging device according to claim 11,
wherein the color mixture correction circuit includes
a multiplier unit configured to multiply respective output signals corresponding to neighboring pixels adjacent to the target pixel of color mixture correction by the correction parameter unique to the address,
an adder unit configured to add the output signal of the multiplier unit to a signal of the target pixel of color mixture correction to obtain a correction signal and
a subtractor unit configured to take a difference between the signal value of the target pixel of color mixture correction pixel and an output signal of the adder unit.

18. The imaging device according to claim 11,
wherein the color mixture correction circuit is configured to average signal values of plural pixels neighboring the target pixel of color mixture correction to set an averaged signal as the signal corresponding to neighboring pixels of the target pixel of color mixture correction and multiply the signal by the correction parameter unique to the address.

19. The imaging device according to claim 11,
wherein the color mixture correction circuit is configured to apply pixels adjacent to the target pixel of color mixture correction in the horizontal direction as well as the vertical direction or in the horizontal direction as well as an oblique direction or in the horizontal direction, the vertical direction as well as the oblique direction as neighboring pixels adjacent to the target pixel of color mixture correction.

20. The imaging device according to claim 11, wherein the correction parameter is a function of a column coordinate and a row coordinate of the target pixel of color mixture correction.

21. An image signal processing method comprising the step of:
correcting color mixture among pixels arranged in the row and column directions, the pixels having plural light receiving units which perform photoelectric conversion and including filters dividing light incident on respective plural light receiving units into plural color components,
wherein, in the step of correcting color mixture, correction processing is performed to a signal value of a target pixel of color mixture correction by associating respective signal values of neighboring pixels adjacent to the target pixel of color mixture correction with correction parameters unique to an address of each signal, the correction parameter being a function of a column coordinate and/or a row coordinate of the target pixel of color mixture correction.

22. The image signal processing method according to claim 21, wherein the correction parameter is a function of a column coordinate and a row coordinate of the target pixel of color mixture correction.

23. A non-transitory computer readable medium storing a program causing a computer to execute image signal processing comprising:
color mixture correction processing to correct color mixture among pixels arranged in the row and column directions, the pixels having plural light receiving units which perform photoelectric conversion and including filters dividing light incident on respective plural light receiving units into plural color components,
wherein, in the color mixture correction processing, correction processing is performed to a signal value of a target pixel of color mixture correction by associating respective signal values of neighboring pixels adjacent to the target pixel of color mixture correction with correction parameters unique to an address of each signal, the correction parameter being a function of a column coordinate and/or a row coordinate of the target pixel of color mixture correction.

24. The non-transitory computer readable medium according to claim 23, wherein the correction parameter is a function of a column coordinate and a row coordinate of the target pixel of color mixture correction.

* * * * *